United States Patent
Sakuma

(10) Patent No.: US 8,988,818 B2
(45) Date of Patent: Mar. 24, 2015

(54) MEDIUM PROCESSING APPARATUS, STORAGE APPARATUS AND CONVEYANCE APPARATUS

(71) Applicant: Fujitsu Limited, Kawasaki-shi, Kanagawa (JP)

(72) Inventor: Ichirou Sakuma, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/321,340

(22) Filed: Jul. 1, 2014

(65) Prior Publication Data
US 2014/0313875 A1    Oct. 23, 2014

Related U.S. Application Data

(63) Continuation of application No. PCT/JP2012/052482, filed on Feb. 3, 2012.

(51) Int. Cl.
*G11B 15/68* (2006.01)
*G11B 17/04* (2006.01)

(52) U.S. Cl.
CPC ........ *G11B 17/0408* (2013.01); *G11B 15/6815* (2013.01); *G11B 15/6825* (2013.01)
USPC ...................................................... 360/92.1

(58) Field of Classification Search
USPC ....................................................... 360/92.1
See application file for complete search history.

(56) References Cited

U.S. PATENT DOCUMENTS

| 5,781,368 | A | 7/1998 | Kotaki et al. |
| 5,856,894 | A * | 1/1999 | Marlowe ...................... 360/92.1 |
| 6,155,766 | A | 12/2000 | Ostwald et al. |
| 6,804,080 | B1 * | 10/2004 | Gavit et al. .................. 360/92.1 |
| 8,264,790 | B2 * | 9/2012 | Aoki ............................ 360/92.1 |
| 2002/0080513 | A1 | 6/2002 | Steinhilber |
| 2011/0013314 | A1 | 1/2011 | Aoki |

FOREIGN PATENT DOCUMENTS

| JP | 07-044829 A | 2/1995 |
| JP | 2002-197758 A | 7/2002 |
| JP | 2003-509794 A | 3/2003 |
| JP | 2003-115146 A | 4/2003 |
| JP | 2011-23068 A | 2/2011 |

OTHER PUBLICATIONS

International Search Report, mailed in connection with PCT/JP2012/052482 and mailed Mar. 13, 2012.
Japanese Office Action mailed Nov. 25, 2014 for corresponding Japanese Patent Application No. 2013-556162, with Partial English Translation, 3 pages.

* cited by examiner

*Primary Examiner* — Mark Blouin
(74) *Attorney, Agent, or Firm* — Fujitsu Patent Center

(57) ABSTRACT

A medium processing apparatus includes a magazine including a plurality of storage units each of which stores the storage medium, the adjacent storage units being connected by a hinge member so that each of the storage units rotates on a shaft, a curved conveyance path that guides the magazine, a conveying unit that conveys the magazine along the conveyance path, and a medium moving unit that moves the storage medium between the storage unit of the conveyed magazine and the processing unit, and thus space saving is achieved.

8 Claims, 30 Drawing Sheets

US 8,988,818 B2

MEDIUM PROCESSING APPARATUS, STORAGE APPARATUS AND CONVEYANCE APPARATUS

CROSS-REFERENCE TO RELATED APPLICATION

This application is a continuation application of International Application PCT/JP2012/052482, filed on Feb. 3, 2012 and designated the U.S., the entire contents of which are incorporated herein by reference.

FIELD

The embodiment discussed herein is directed to a medium processing apparatus, a storage apparatus, and a conveyance apparatus.

BACKGROUND

In recent years, as computer-related apparatuses are improved in performance, there has been a demand for an improvement of a recording capacity in magnetic recording apparatuses. For example, in a magnetic tape apparatus, there is a strong demand for an apparatus that consecutively processes a plurality of magnetic tape cartridges using a feature of a magnetic tape cartridge serving as a changeable recording medium. From this point of view, there is a demand for supply of a magnetic tape apparatus with a compact cartridge auto-loader having excellent operability.

FIG. 29 is a perspective view illustrating an example of a magnetic tape apparatus with a cartridge auto-loader according to a related art, and FIG. 30 is a perspective view illustrating an example of magazine.

A cartridge auto-loader 200 is attached to the front of an apparatus body 400. A plurality of magnetic tape cartridges 600 (for example, seven magnetic tape cartridges 600) are stored in a magazine 800 illustrated in FIG. 30.

The cartridge auto-loader 200 includes a lifting portion that lifts the magazine 300 up or down, a feed mechanism portion that inserts the magnetic tape cartridge 600 stored in the magazine 800 into the apparatus body 400, a circuit portion that controls each portion, and an operation panel for a user.

In the cartridge auto-loader of the related art having the above configuration, the lifting portion lifts the magazine 800 up or down, and places the magnetic tape cartridge 600 of an access target at an accessible position through the feed mechanism portion. Thereafter, the feed mechanism portion conveys the magnetic tape cartridge 600 to be inserted into the apparatus body 400, and the apparatus body 400 performs a reading/writing process on the magnetic tape cartridge 600.

Patent Document 1: Japanese Laid-open Patent Publication No. 7-44829

However, the cartridge auto-loader 200 of the related art has the configuration of moving the magazine 800 up and down, and thus there is a problem in that it is not suitable for space saving. For example, when a plurality of magnetic tape apparatuses are stored in a rack and used, it is necessary to secure a space for vertical movement of the magazine 800, and thus a dead space occurs, and efficiency for mounting the apparatus to the rack is deteriorated.

SUMMARY

According to an aspect of the embodiments, a medium processing apparatus is a medium processing apparatus including a processing unit performing a data recording and/or reading process on a storage medium, and includes a magazine including a plurality of storage units each of which stores the storage medium, the adjacent storage units being connected by a hinge member so that each of the storage units rotates on a shaft, a curved conveyance path that guides the magazine, a conveying unit that conveys the magazine along the conveyance path, and a medium moving unit that moves the storage medium between the storage unit of the conveyed magazine and the processing unit.

Further, a storage apparatus is a portable storage apparatus that includes a plurality of storage units each of which stores a storage medium and that is removably attached to a medium processing apparatus, the medium processing apparatus performing a data recording and/or reading process an the storage medium, and the portable storage apparatus includes hinge members that connect the adjacent storage units so that each of the storage units rotates on a shaft, and a fixing member that fixes the hinge member at a closed position.

A conveyance apparatus includes a magazine that includes a plurality of storage units each of which stores an article, the adjacent storage units being connected by a hinge member so that each of the storage units rotates on a shaft, a curved conveyance path that guides the magazine, a conveying unit that conveys the magazine along the conveyance path, and an article moving unit that moves the article between the storage unit of the conveyed magazine and a processing unit that performs processing on the article.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
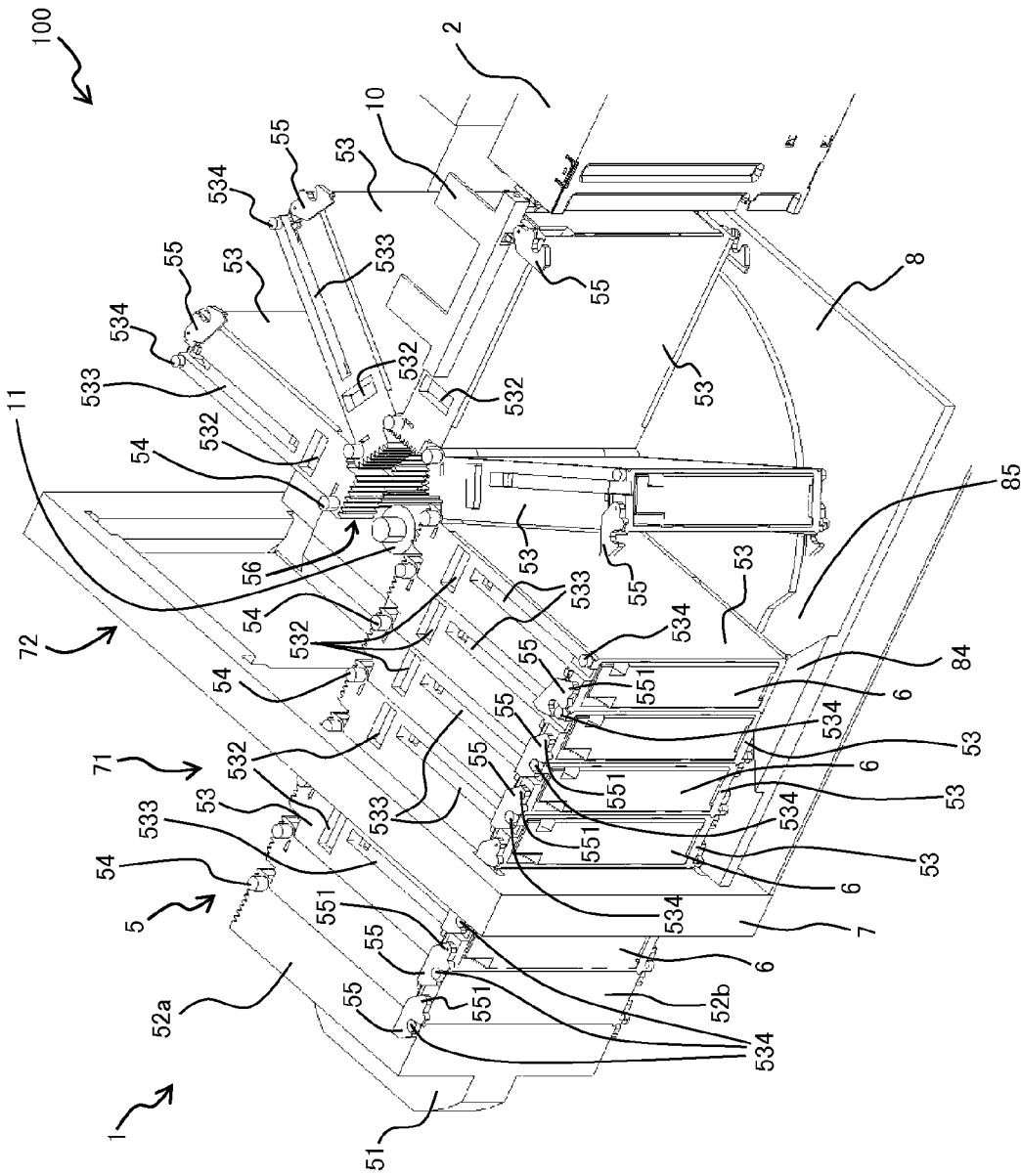
FIG. 1 is a perspective view illustrating an internal configuration of a cartridge auto-loader according to an embodiment.

Hereinafter, an exemplary embodiment of a medium processing apparatus, a storage apparatus, and a conveyance apparatus will be described with reference to the appended drawings. The following embodiment is merely an example, and not intended to exclude the application of various kinds of modified examples or techniques that are not set forth in the embodiment. In other words, various modifications (for example, a combination of an embodiment and each modified example) can be made on the present embodiment within a range not departing from the gist thereof. Further, each drawing is not intended to include only components illustrated in each drawing and may include another function or the like. In the following drawings, for convenience, illustration of some reference numerals is not provided.

(A) Embodiment

Figure 2:
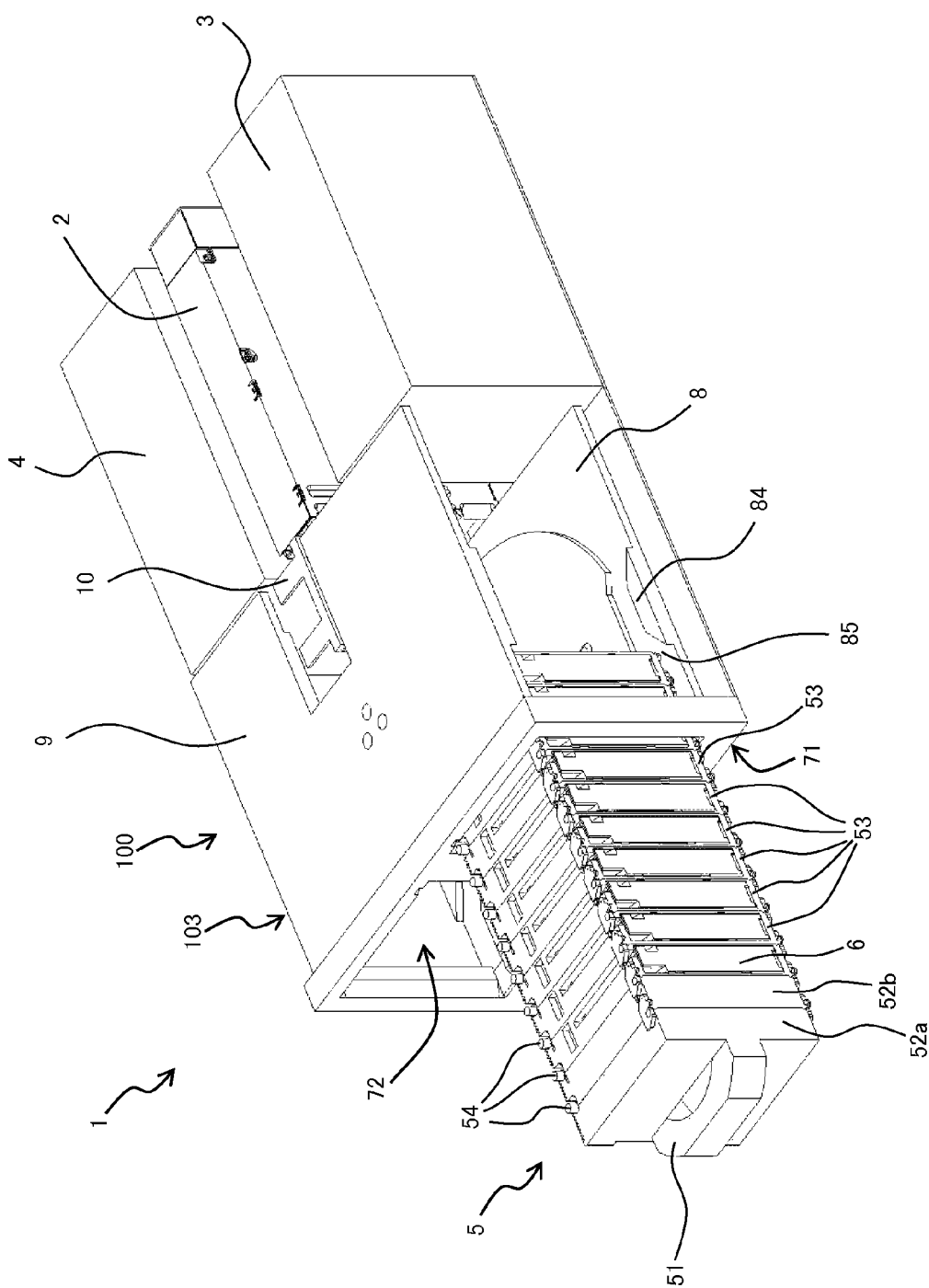
FIG. 2 is a perspective view of a medium processing apparatus including a cartridge auto-loader according to an embodiment.

FIG. 1 is a perspective view illustrating an internal configuration of a cartridge auto-loader 100 according to an embodiment, and FIG. 2 is a perspective view of a medium processing apparatus 1 including the cartridge auto-loader 100.

The medium processing apparatus 1 is a processing apparatus that performs, for example, a data writing process or a data read process on a plurality of recording media (media or articles) 6. For example, the medium processing apparatus 1 is connected with a host apparatus (a higher-level apparatus) (not illustrated) via a communication line, and performs a data access process on the medium 6 according to a request from the host apparatus.

The present embodiment will be described with an example of using a cartridge including a magnetic tape therein as the recording medium 6, that is, a tape cartridge. Hereinafter, there are cases in which the recording medium 6 is referred to as a "tape cartridge 6," and the medium processing apparatus 1 is referred to as a "magnetic tape apparatus 1".

The tape cartridge 6 includes a magnetic tape wound on a reel 63 (see FIG. 6) therein, and is configured such that the magnetic tape can be extracted through an outlet (not illustrated). As the tape cartridge 6, various kinds of known tape cartridges can be used, and a description thereof is not provided.

In the magnetic tape apparatus 1, a magazine (storage apparatus) 5 in which one or more tape cartridges 6 are stored is mounted in the cartridge auto-loader (conveyance apparatus) 100, and the magazine 5 is conveyed by the cartridge auto-loader 100. As illustrated in FIG. 1, data access to the conveyed tape cartridge 6 is performed through a tape drive 2.

[Magazine]

Figure 3:
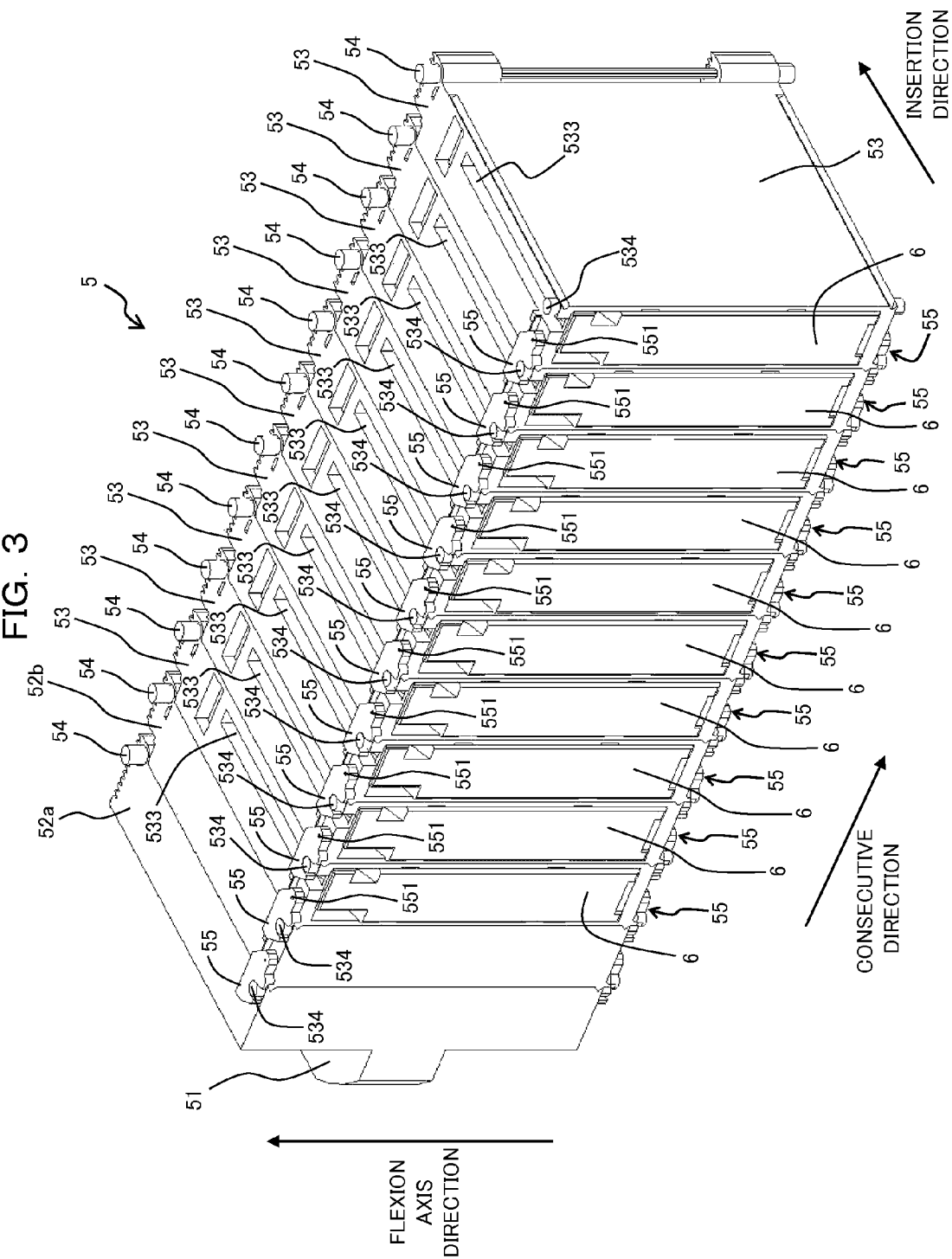
FIG. 3 is a perspective view of a magazine according to an embodiment.
Figure 4:
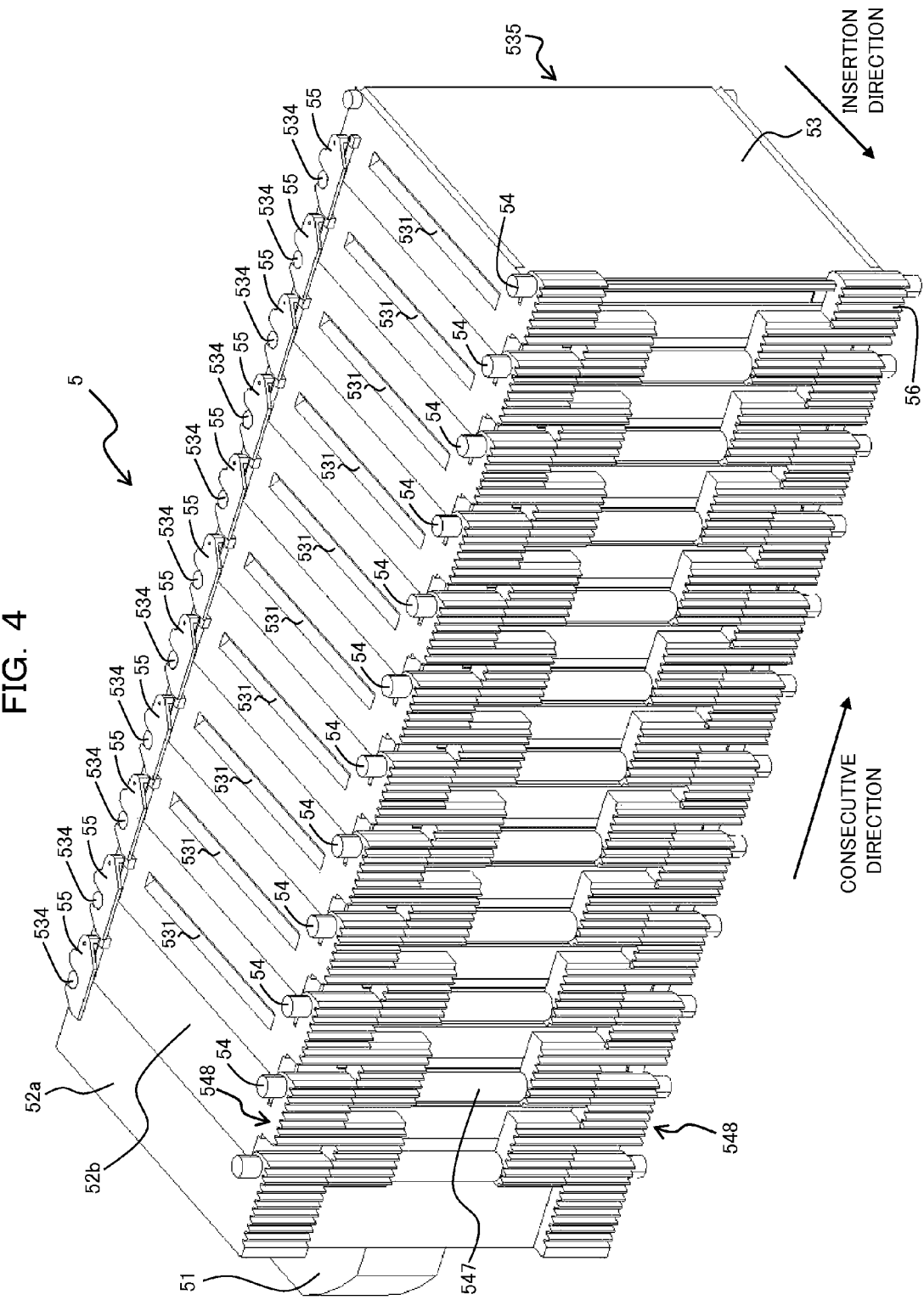
FIG. 4 is a perspective view illustrating a back side of the magazine illustrated in FIG. 3.
Figure 5:
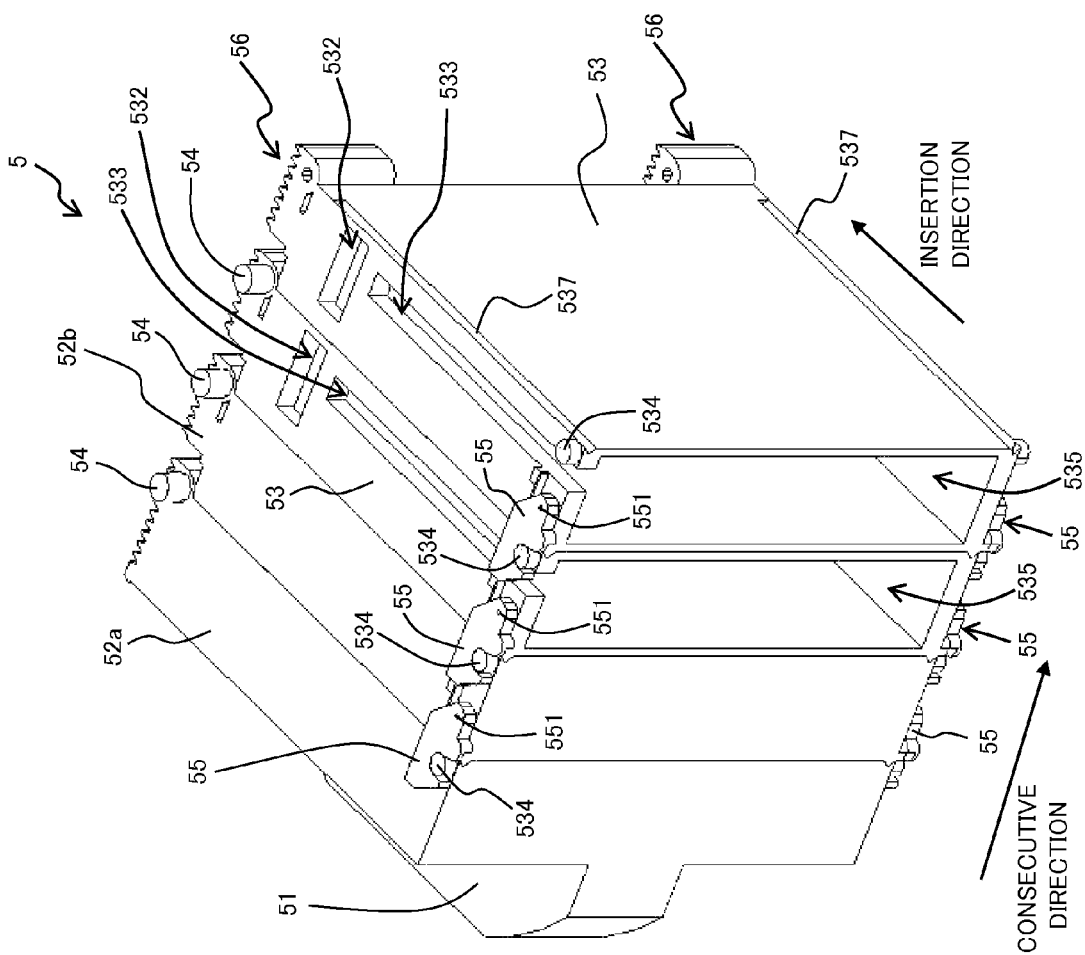
FIG. 5 is a partial perspective view of the magazine illustrated in FIG. 3.
Figure 6:
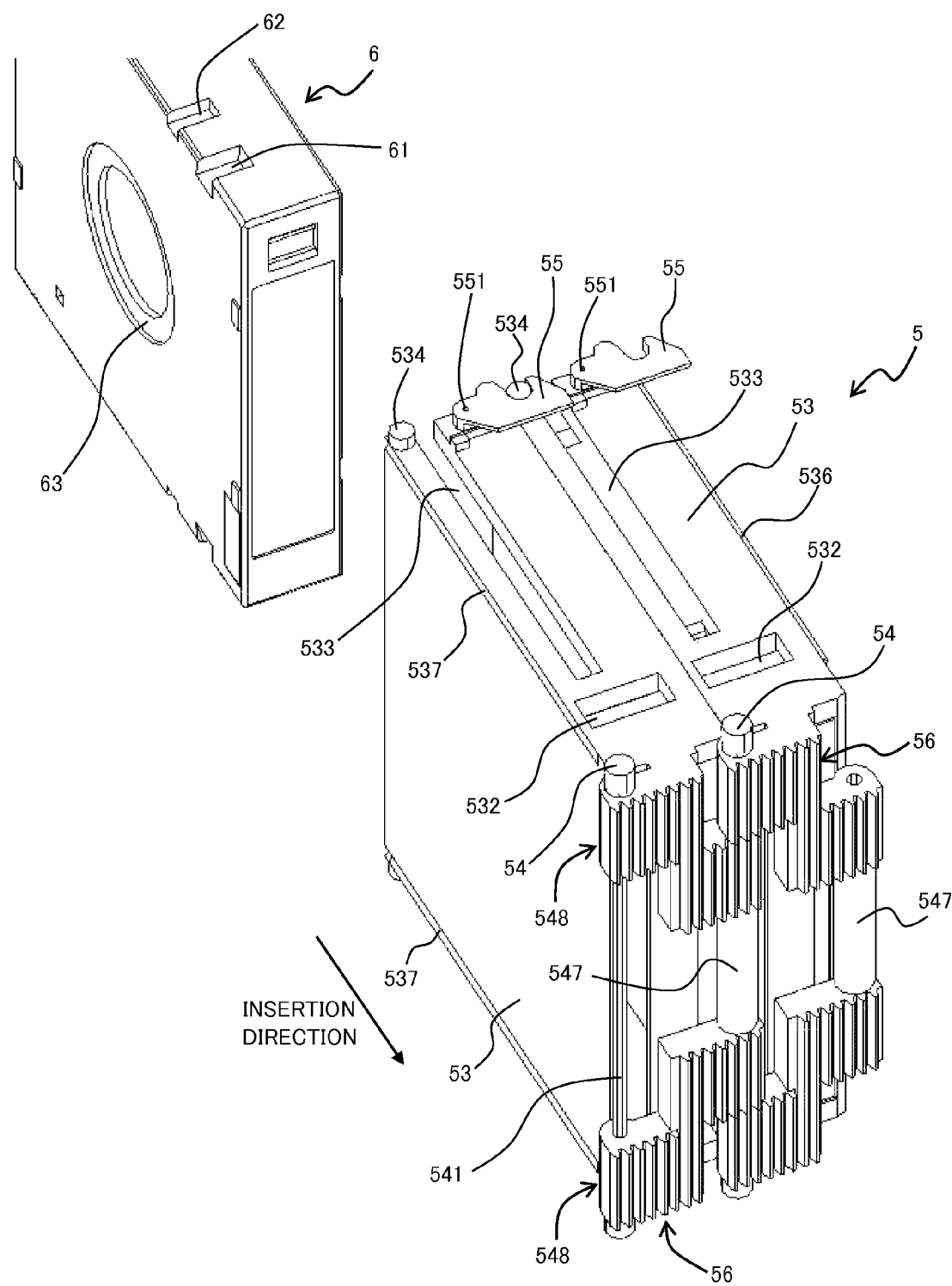
FIG. 6 is a partial perspective view illustrating the magazine illustrated in FIG. 5 which is viewed from a connection shaft side.

FIG. 3 is a perspective view of the magazine 5 according to the embodiment, and FIG. 4 is a perspective view illustrating the back side of the magazine 5 illustrated in FIG. 3. FIG. 5 is a partial perspective view of the magazine 5 illustrated in FIG. 3, and FIG. 6 is a partial perspective view illustrating the magazine 5 illustrated in FIG. 5 which is viewed from a connection shaft 54 side.

The magazine 5 includes a plurality of magazine cells 53 (for example, 10 magazine cells 53 in the example illustrated in FIG. 3) and dummy cells 52a and 52b, and is configured such that the plurality of magazine cells 53 are connected with the dummy cells 52a and 52b.

The magazine 5 is a portable storage apparatus that is carried in a state in which one or more tape cartridges 6 are stored in the magazine cell 53, and stored in the cartridge auto-loader 100.

The dummy cell 52a includes a handle 51 which the user grabs to carry the magazine 5, and is arranged on an end portion of the magazine 5.

The magazine cell 53 is a box-like body in which one tape cartridge 6 is storable, and has a rectangular thick plate-like shape almost similar to the tape cartridge 6. In the magazine 5, the plurality of magazine cells 53 are consecutively lined up in a plate thickness direction thereof, that is, a direction along a rotation axis of the reel 63 of the tape cartridge 6 to be stored. Hereinafter, a direction in which the magazine cells 53 are consecutive in the magazine 5, that is, a direction from the end portion at the side at which the dummy cell 52a is arranged toward the other end portion is referred to as a "consecutive direction" (for example, see FIG. 3). Further, two opposite surfaces facing in the consecutive direction in the magazine cell 53 are hereinafter referred to as "side surfaces" for convenience.

As illustrated in FIG. 5, an insertion opening 535 through which the tape cartridge 6 is inserted or extracted is formed on a long rectangular surface in the magazine cell 53. Further, as illustrated in FIG. 6, the tape cartridge 6 is inserted through the insertion opening 535 starting from the surface at the side opposite to the surface on which the outlet (not illustrated) for the magnetic tape is formed. Hereinafter, in the magazine cell 53, a side at which the insertion opening 535 is formed is referred to as a "front surface" for convenience. Further, a surface at a side opposite to the front surface is referred to as a "back surface" for convenience. Further, in the magazine cell 53, a direction in which the taps cartridge 6 is inserted through the insertion opening 535 is referred to as an "insertion direction". Furthermore, in the magazine 5, a direction vertical to the consecutive direction and the insertion direction is referred to as a "flexion axis direction" (for example, see FIG. 3).

Further, for example, as illustrated in FIG. 4, in the magazine cell 53, a positioning groove 531 into which a positioning block 86 of a housing 103 (which will be described later) is fitted is formed on one of two surfaces that are parallel to both the consecutive direction and the insertion direction. Hereinafter, in the magazine cell 53, the surface on which the positioning groove 531 is formed is referred to as a "bottom surface" for convenience. Further, in the magazine cell 53, the surface at the side opposite to the bottom surface is referred to as a "top surface" for convenience.

Further, for example, as illustrated in FIG. 5, a feeder passage groove 533 and a fixing notch 532 are formed in the top surface of the magazine cell 53.

The feeder passage groove 533 is a groove that guides a feeder mechanism 10 which will be described later when the tape cartridge 6 is moved between the magazine cell 53 and the tape drive 2 which will be described later, and is formed in the top surface of the magazine cell 53 to extend from the insertion opening 535 side toward the back surface side.

The fixing notch 532 is a protrusion for fixing the tape cartridge 6 in the magazine cell 53, and protrudes toward the inside of the magazine cell 53. When the tape cartridge 6 is inserted into the magazine cell 53, the fixing notch 532 is fitted into and engages with a groove 61 (see FIG. 6) formed in the tape cartridge 6 and thus fixes the tape cartridge 6 in the magazine cell 53. Preferably, the fixing notch 532 has, for example, a certain level of elasticity so that the tape cartridge 6 is naturally inserted into or extracted from the magazine cell 53. The groove 61 is commonly formed in the tape cartridge 6.

Each magazine cell 53 is hinge-connected with another adjacent magazine cell 53 through a connection shaft 54 on the back surface side.

Figure 7:
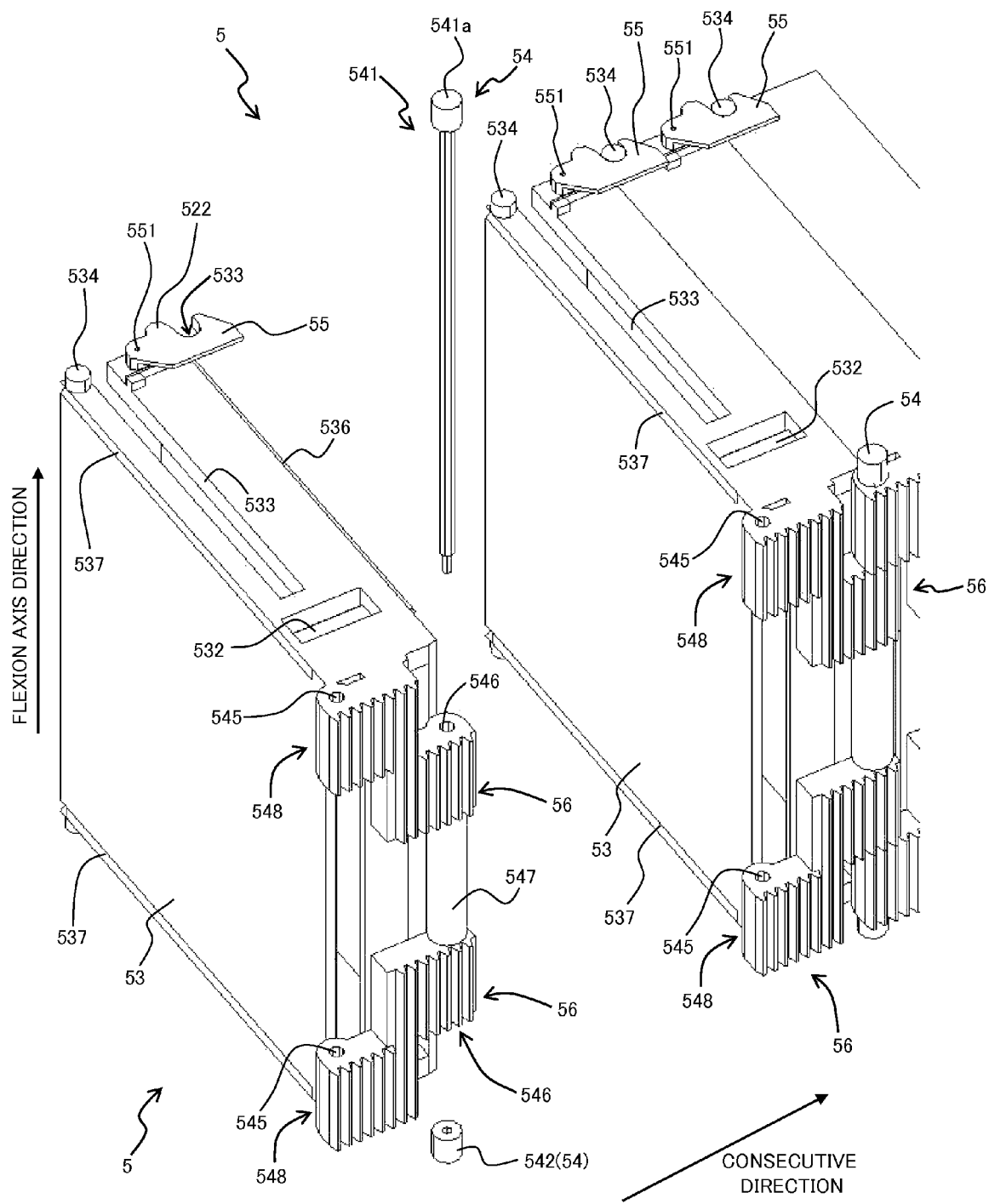
FIG. 7 is an exploded perspective view illustrating a back surface side configuration of a magazine according to an embodiment.
Figure 8:
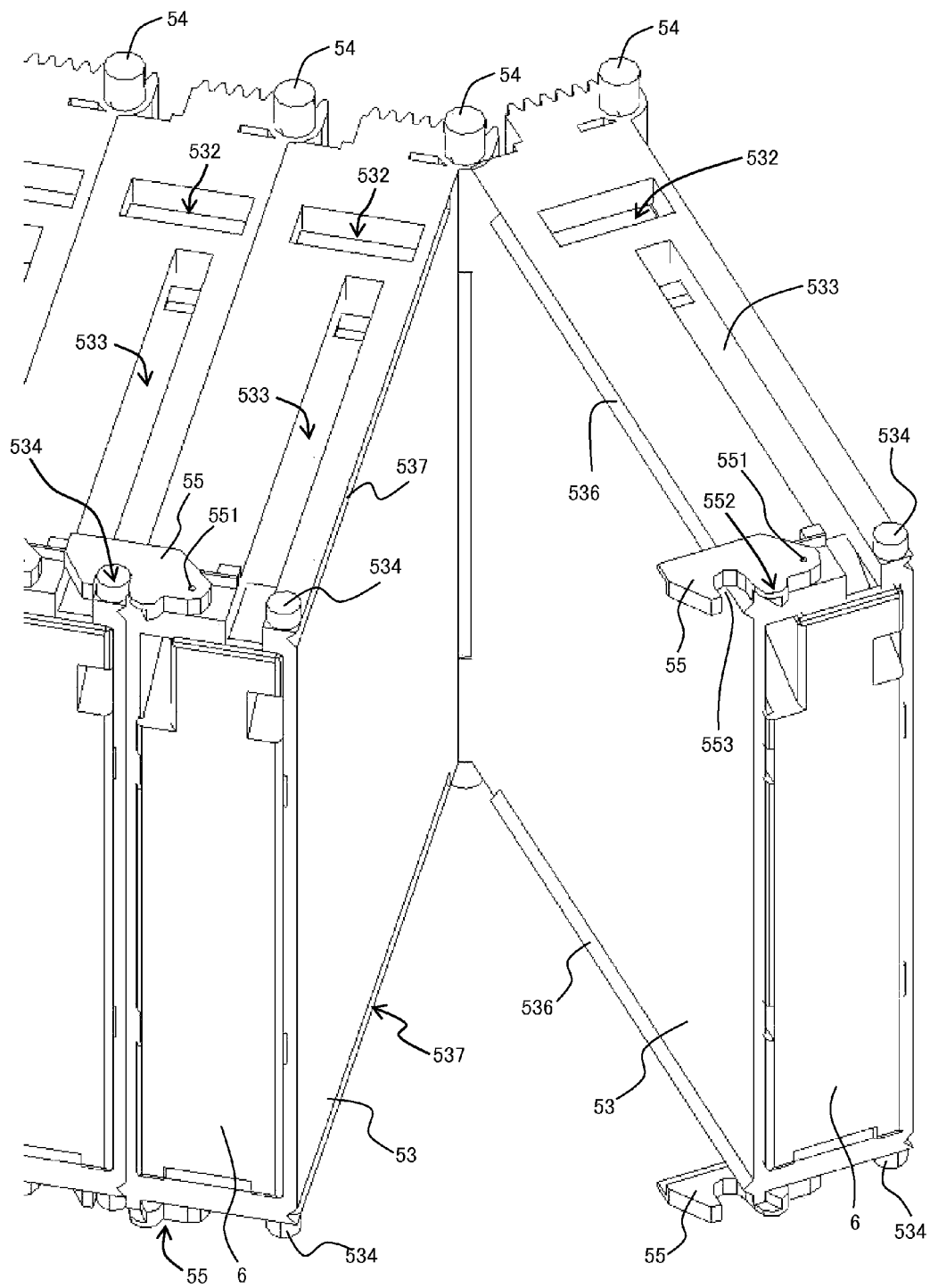
FIG. 8 is a partial perspective view illustrating a magazine according to an embodiment which is viewed from a front surface side.
Figure 9:
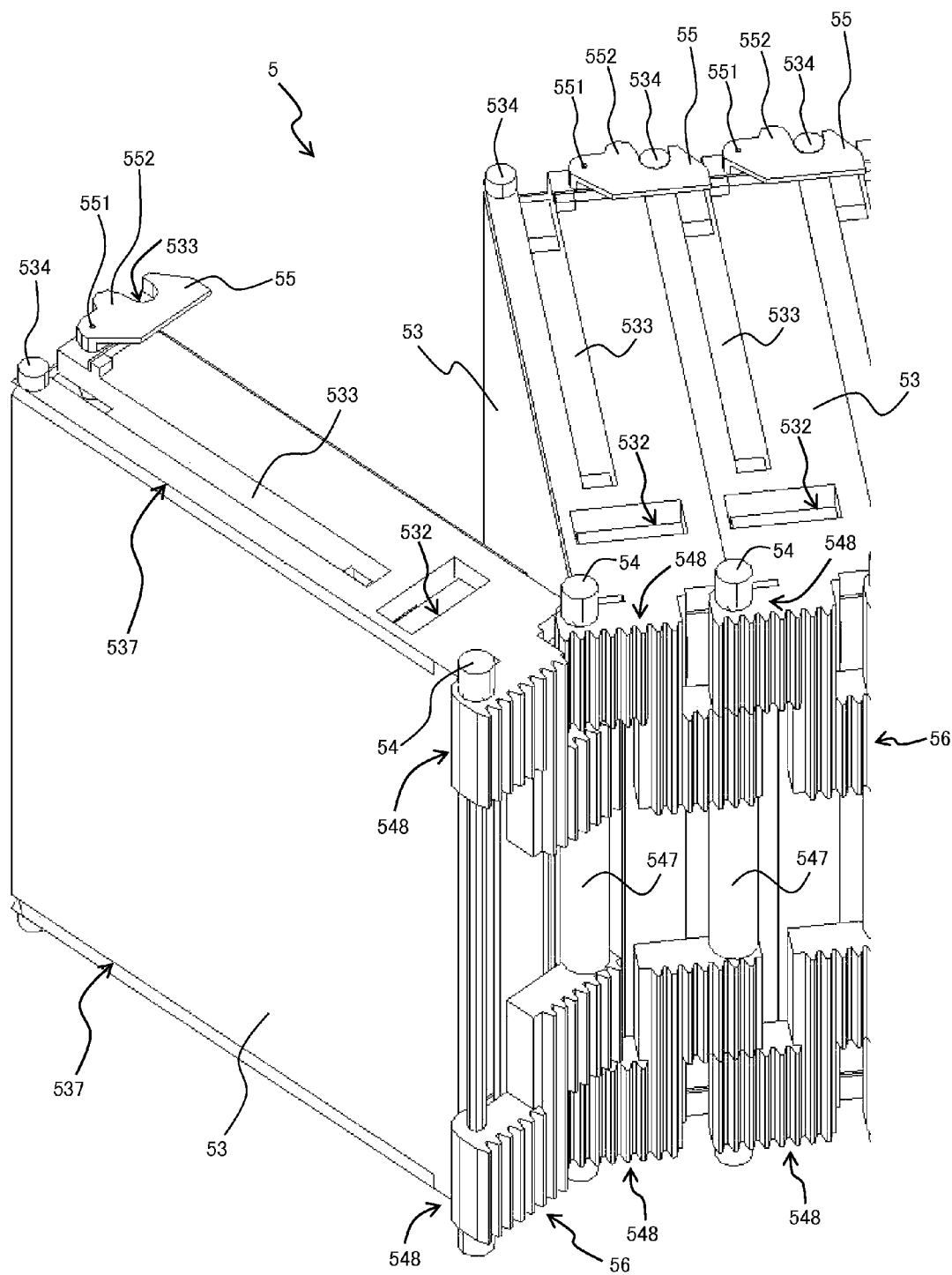
FIG. 9 is a partial perspective view illustrating a magazine according to an embodiment which is viewed from a back surface side.

FIG. 7 is an exploded perspective view illustrating a back surface side configuration of the magazine 5 according to the embodiment, FIG. 8 is a partial perspective view when it is viewed from the front surface side, and FIG. 9 is a partial perspective view when it is viewed from the back surface side.

As illustrated in FIG. 7, on the back surface side of each magazine cell 53, a first hinge shaft hole 546 is formed in a first hinge barrel 547 arranged in the flexion axis direction in the flexion axis direction. Further, on the back surface side of each magazine cell 53, a second hinge barrel 548 is formed in the flexion axis direction at the position deviated from the first hinge barrel 547 in the consecutive direction. A second hinge shaft hole 545 is formed in the second hinge barrel 548 in the flexion axis direction. The first hinge barrel 547 and the second hinge barrel 548 are formed at the positions also deviated in the flexion axis direction. In other words, as illustrated in FIGS. 6 and 7, in a state in which the plurality of magazine cells 53 are lined up in the consecutive direction to be adjacent to each other, the first hinge barrel 547 of one magazine cell 53 doss not interfere with the second hinge barrel 548 of another adjacent magazine cell 53. Further, in a state in which the plurality of magazine cells 53 are lined up in the consecutive direction to be adjacent to each other, the first hinge shaft hole 546 of one magazine cell 53 is configured to communicate with the second hinge shaft hole 545 of another adjacent magazine cell 53.

In the present embodiment, the two second hinge barrels 548 are arranged at the positions at which the first hinge barrel 547 is interposed therebetween in the flexion axis direction.

As illustrated in FIGS. 8 and 9, the two magazine cells 53 to be connected are arranged in the consecutive direction, a shaft 541 of the connection shaft 54 penetrates through the first hinge shaft hole 546 of one magazine cell 53 and each second hinge shaft hole 545 of another adjacent magazine cell 53, which are aligned to communicate with each other.

Thus, the neighboring magazine cells 53 are hinge-connected to be rotatable on the connection shaft 54. In other words, the magazine cells 53 are connected to rotate on the connection shaft 54 (shaft). A cylindrical retainer 541a is arranged on an end portion of the shaft 541. Further, an end portion at a side opposite to a side at which the retainer 541a of the shaft 541 is arranged is screwed into a cylindrical shaft end portion 542 and fixed.

In other words, the connection shaft 54, the first hinge barrel 547, and the second hinge barrel 548 configure a hinge member.

In the magazine 5, the user can to implement the magazine 5 capable of storing a desired number of tape cartridges 6 by hinge-connecting an arbitrary number of magazine cells 53 using the connection shaft 54.

As illustrated in FIGS. 7 and 9, a rack gear 56 whose teeth are cut in the flexion axis direction is arranged on the back surface side end surface of the magazine cell 53, that is, the end surfaces of the first hinge barrel 547 and the second hinge barrel 548 at the back surface side.

Pitches of the rack gear 56 are aligned so that the rack gear 56 mesh with a magazine feed gear 11 of the cartridge autoloader 100 which will be described later. Further, the rack gears 56 of the magazine cells 53 are configured such that their pitches are aligned with each other in a straight line connection state in which the magazine cells 53 hinge-connected by the connection shaft 54 as described above are parallel to each other as illustrated in FIGS. 3 and 4. Hereinafter, there are cases in which the straight line connection state in which the hinge-connected magazine cells 53 are parallel to each other as illustrated in FIGS. 3 and 4 is referred to a "state in which the magazine cell 53 is closed" or a "state in which the magazine 5 is closed".

Further, as illustrated in FIG. 8, lateral deviation preventing convex portions 536 are formed to extend along a side at the top surface side and a side at the bottom surface side in one side surface (the right surface in the example illustrated in FIG. 8) of the magazine cell 53. Further, lateral deviation preventing concave portion 537 are formed to extend along a side at the top surface side and a side at the bottom surface side in the other side surface (the left surface in the example illustrated in FIG. 8) of the magazine cell 53. In the state in which the magazine cells 53 hinge-connected to be rotatable are closed, for example, as illustrated in FIG. 4 as described above, the lateral deviation preventing convex portion 536 and the lateral deviation preventing concave portion 537 of the neighboring magazine cells 53 engage with each other. Thus, it is possible to prevent the deviation of the magazine cell 53 in the flexion axis direction in the state in which the magazine cell 53 is closed.

Further, a connection boss 534 and a connection hook 55 are arranged on an end portion at the front surface side in the top surface of the magazine cell 53.

The connection boss 534 is a cylindrical protrusion, and protrudes vertically from the top surface in the front surface side of the magazine cell 53. The connection hook 55 is configured to be rotatable on a shaft 551 vertically arranged on the top surface of the magazine cell 53.

Figure 10:
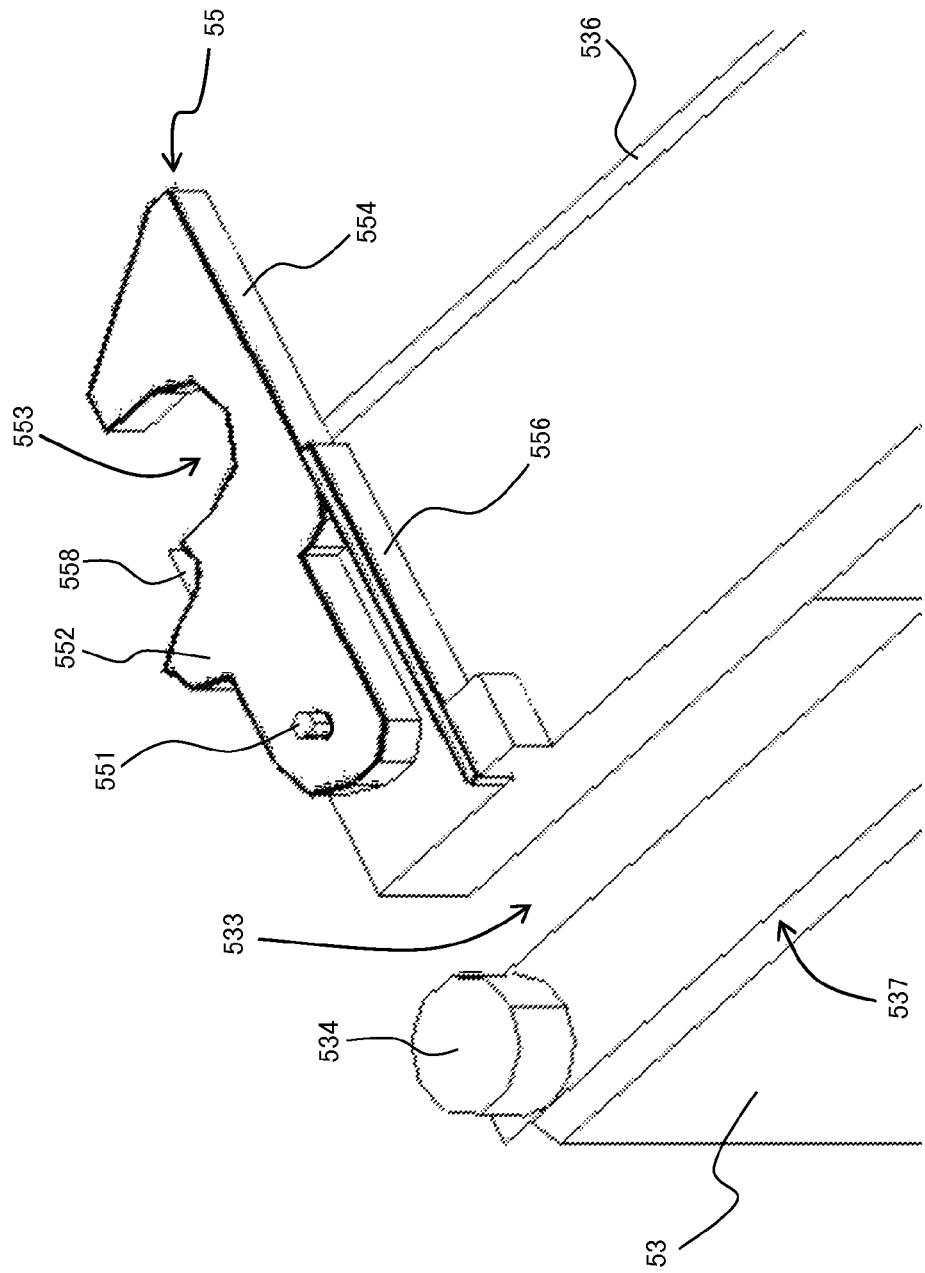
FIG. 10 is a partial perspective view perspectively illustrating a configuration of a connection hook of a magazine according to an embodiment.
Figure 11:
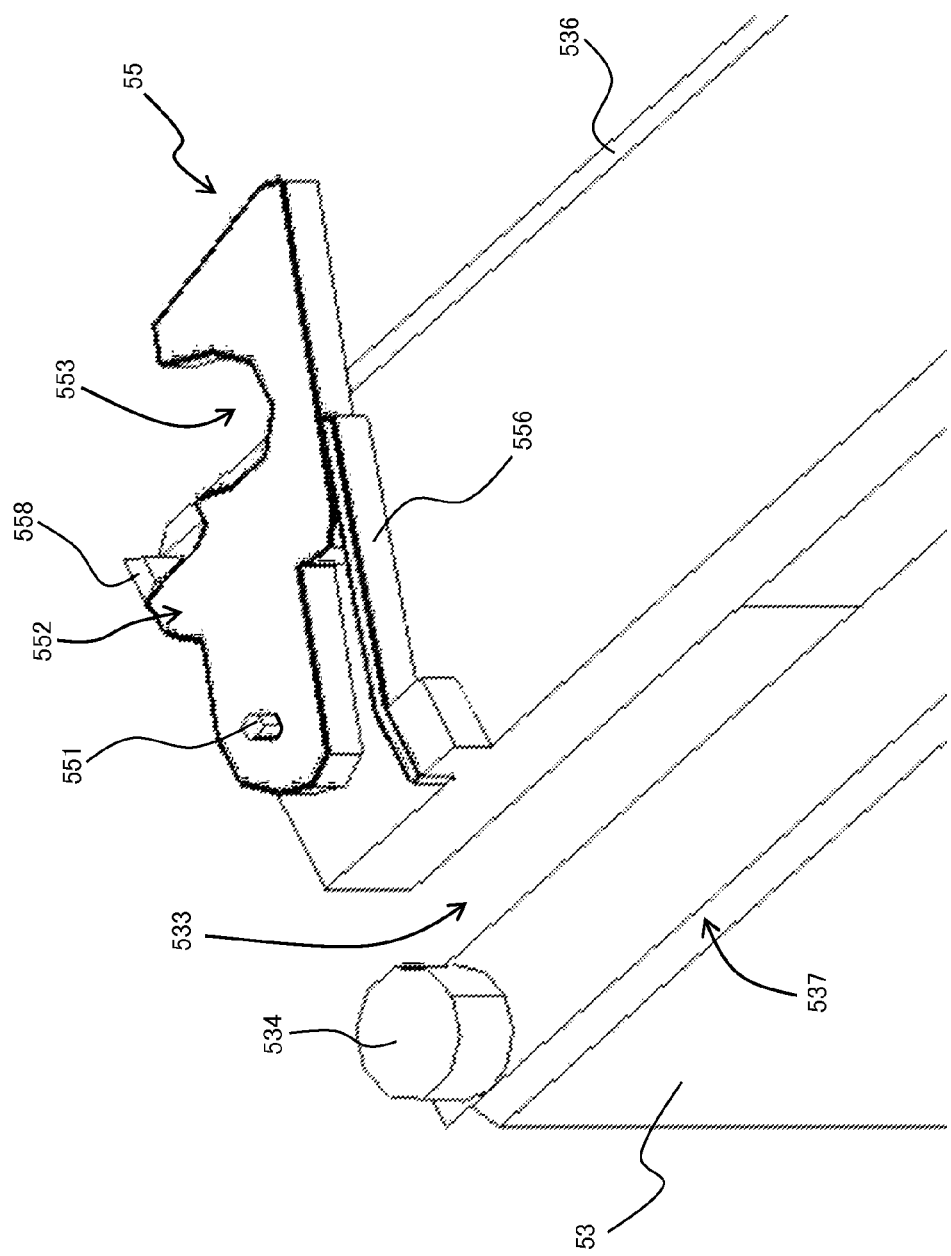
FIG. 11 is a partial perspective view perspectively illustrating a configuration of a connection hook of a magazine according to an embodiment.

Each of FIGS. 10 and 11 is a partial perspective views perspectively illustrating a configuration of the connection hook 55 of the magazine 5 according to the embodiment, FIG. 10 illustrates a closed state of the connection hook 55, and FIG. 11 illustrates an open state of the connection hook 55. Further, FIGS. 10 and 11 illustrate a state in which a part of the connection hook 55 is cut at an intermediate position in the flexion axis direction.

The connection hook 55 includes an arc-like concave portion 553 capable of partially surrounding the outer circumference of the connection boss 534 as illustrated in FIGS. 10 and 11. The connection hook 55 engages with the connection boss 534 such that the connection boss 534 of the adjacent magazine cell 53 is received in the concave portion 553. In other words, the connection hook 55 and the connection boss 534 function as a fixing member that fixes the hinge member of the magazine 5 at a closed position. Hereinafter, there are cases in which a state in which the connection hook 55 is engaged with the adjacent magazine cell 53 with the concave portion 553 receiving the connection boss 534 of the adjacent magazine cell 53 is referred to as a "lock state".

Further, a connection hook spring 556 urging the connection hook 55 to rotate toward the front surface side is arranged on the top surface of the magazine cell 53. Further, in the top surface of the magazine cell 53, a stopper 558 protrudes at the front surface side further than the connection hook 55. The connection hook 55 that is urged to rotate toward the front surface side through the connection hook spring 556 comes into contact with the stopper 558, and thus the rotation toward the front surface side is prevented from being further performed. Hereinafter, there are cases in which a state in which the connection hook 55 rotates toward the front surface side and comes into contact with the stopper 558 as illustrated in FIG. 10 is referred to as a "closed state". The lock state is made in the closed state.

In other words, the connection hook 55 is constantly pushed to the front surface side through the connection hook spring 556, and pressed against the stopper 558 protruding the magazine cell 53. Thus, the connection hook 55 is urged through the connection hook spring 556 to maintain the closed state illustrated in FIG. 10.

Further, the connection hook 55 includes a protrusion 552 protruding toward the front surface side of the magazine cell 53 in the closed state illustrated in FIG. 10. For example, in the closed state of the connection hook 55, the protrusion 552 protrudes toward the front surface side of the magazine cell 53 by almost the same length as the diameter of the connection boss 534. The protrusion 552 preferably has a smooth arc shape.

Further, as the protrusion 552 is pushed toward the back surface side, the connection hook 55 rotates on the shaft 551 toward the back surface side, and a gap in which the connection boss 534 can be escaped from the concave portion 553 is formed as illustrated in FIG. 11.

Further, in the state in which the protrusion 552 is pushed, the connection hook 55 rotates toward the back surface side, and a gap through which the connection boss 534 can pass is formed, the protrusion 552 comes into contact with the stopper 558, and thus the rotation toward the back surface side is prevented from being further performed as illustrated in FIG. 11. Hereinafter, there are cases in which the state in which the connection hook 55 rotates toward the back surface side, and the gap through which the connection boss 534 can pass is formed as illustrated in FIG. 11 is referred to as an "open state". The unlock state is made in the open state.

The connection hook 55 in the lock state illustrated in FIG. 10 enters the open state illustrated in FIG. 11 as the protrusion 552 is pushed toward the back surface side.

The connection hook 55 and the connection boss 534 are also arranged on the end portion of the insertion opening 535 in the bottom surface of the magazine cell 53. FIGS. 10 and 11 illustrate connection hook 55 arranged on the top surface of the magazine cell 53, but the connection hook 55 and the connection boss 534 arranged on the bottom surface of the magazine cell 53 have the same configuration. The connection hooks 55 arranged on the top surface and the bottom surface of the magazine cell 53 engage with the connection bosses 534 of another adjacent magazine cell 53.

In the cartridge auto-loader 100, as described above, the lock state is released as a connection hook release block 941 of an upper guide 9 and a connection hook release block 841 of a lower guide 8 push the protrusions 552 of the connection hooks 55 of the magazine cell 53 being conveyed toward the back surface side.

The dummy cell 52b is arranged between the dummy cell 52a and the magazine cell 53. The tape cartridge 6 is not stored in the dummy cell 52b. The dummy cell 52b has a similar configuration to the magazine cell 53 except that the configuration for storing the tape cartridge 6 such as the insertion opening 535, the feeder passage groove 533, and the fixing notch 532 is not arranged.

The dummy cells 52a and 52b are also hinge-connected with the adjacent dummy cells 52b and 52a or the magazine cell 53 through the connection shaft 54 at the back surface side, similarly to the magazine cell 53. Further, the dummy cells 52a and 52b engage with the adjacent dummy cells 52b and 52a or the magazine cell 53 through the connection hook 55 and the connection boss 534 at the front surface side, similarly to the magazine cell 53.

The dummy cells 52a and 52b are provided to arrange the magazine cell 53 disposed at the position closest to the dummy cell 52a side in the magazine 5 to the tape supply position to the tape drive 2. In other words, as the magazine feed gear 11 of the cartridge auto-loader 100 which will be described later conveys the dummy cells 52a and 52b subsequently to the magazine cells 53, the magazine cell 53 adjacent to the dummy cell 52a in the magazine 5 can be arranged at the tape supply position.

Further, through the above configuration, in the magazine 5, the plurality of magazine cells 53 and the dummy cells 52a and 52b having the same configuration are rotatably hinge-connected with the adjacent magazine cell 53 or the dummy cells 52a and 52b through the connection shaft 54 at the back surface. In other words, the plurality of magazine cells 53 and the dummy cells 52a and 52b are consecutively connected by a hinge connection. Further, the plurality of hinge-connected magazine cells 53 and the like are fixed as the connection hook 55 engages with the connection boss 534 of the neighboring magazine cell 53 at the front surface side in the state in which the magazine cell 53 is closed. As a result, the magazine 5 is held in the state in which the plurality of magazine cells 53 and the like are closed, and thus the magazine 5 is easy to handle, for example, it is easy to carry.

[Magnetic Tape Apparatus]

The magnetic tape apparatus 1 includes the cartridge auto-loader 100, the tape drive (processing unit) 2, a control unit 3, and a power supply unit 4 as illustrated in FIG. 2. The magnetic tape apparatus 1 is of a rack mount type, and for example, dimensions in longitudinal, horizontal, and vertical directions are set according to a certain standard or the like.

The power supply unit 4 is a power supply means that supplies electric power to the respective components of the magnetic tape apparatus 1, and is supplied with an electric current from, for example, an alternating current (AC) power source. The power supply means is not limited to an external AC power source, and may include, for example, a battery for power supply.

The control unit 3 controls the respective components of the magnetic tape apparatus 1. For example, the control unit 3 performs control such that the magazine 5 is conveyed and positioned in the cartridge auto-loader 100 which will be described later. Further, the control unit 3 also performs control such that the tape cartridge 6 is moved between the tape drive 2 and the magazine cells 53 through the feeder mechanism 10 in the cartridge auto-loader 100. Furthermore, the control unit 3 also perform control such that the tape drive 2 accesses the tape cartridge 6.

The tape drive 2 performs data access such as writing and reading on the tape cartridge 6 inserted through the feeder mechanism 10 which will be described later. For example, the tape drive 2 writes data received from the host apparatus (not illustrated) in a magnetic tape in the tape cartridge 6, reads data recorded in the magnetic tape, and transmits the read data to the host apparatus or the like.

The tape drive 2 is configured to allow the tape cartridge 6 to be inserted through an insertion opening 21 (see FIG. 12), and stores the tape cartridge 6 therein. The tape drive 2 further includes a magnetic head (not illustrated). The tape drive 2 reads or writes data from or in the magnetic tape extracted from the reel 63 of the tape cartridge 6 through the outlet of the tape cartridge 6 through the magnetic head. As the tape drive 2, various kinds of apparatuses can be used, but a detailed description thereof is not provided.

The cartridge auto-loader 100 includes the housing 103 as illustrated in FIG. 2, and magazine 5 storing the plurality of tape cartridges 6 is inserted into the housing 103. The cartridge auto-loader 100 feeds the tape cartridge 6 of the access target among the plurality of tape cartridges 6 stored in the magazine 5 to the tape drive 2. For example, in the example illustrated in FIG. 1, the tape cartridge 6 of the third magazine cell 53 from the head in the consecutive direction is supplied to the tape drive 2.

Figure 12:
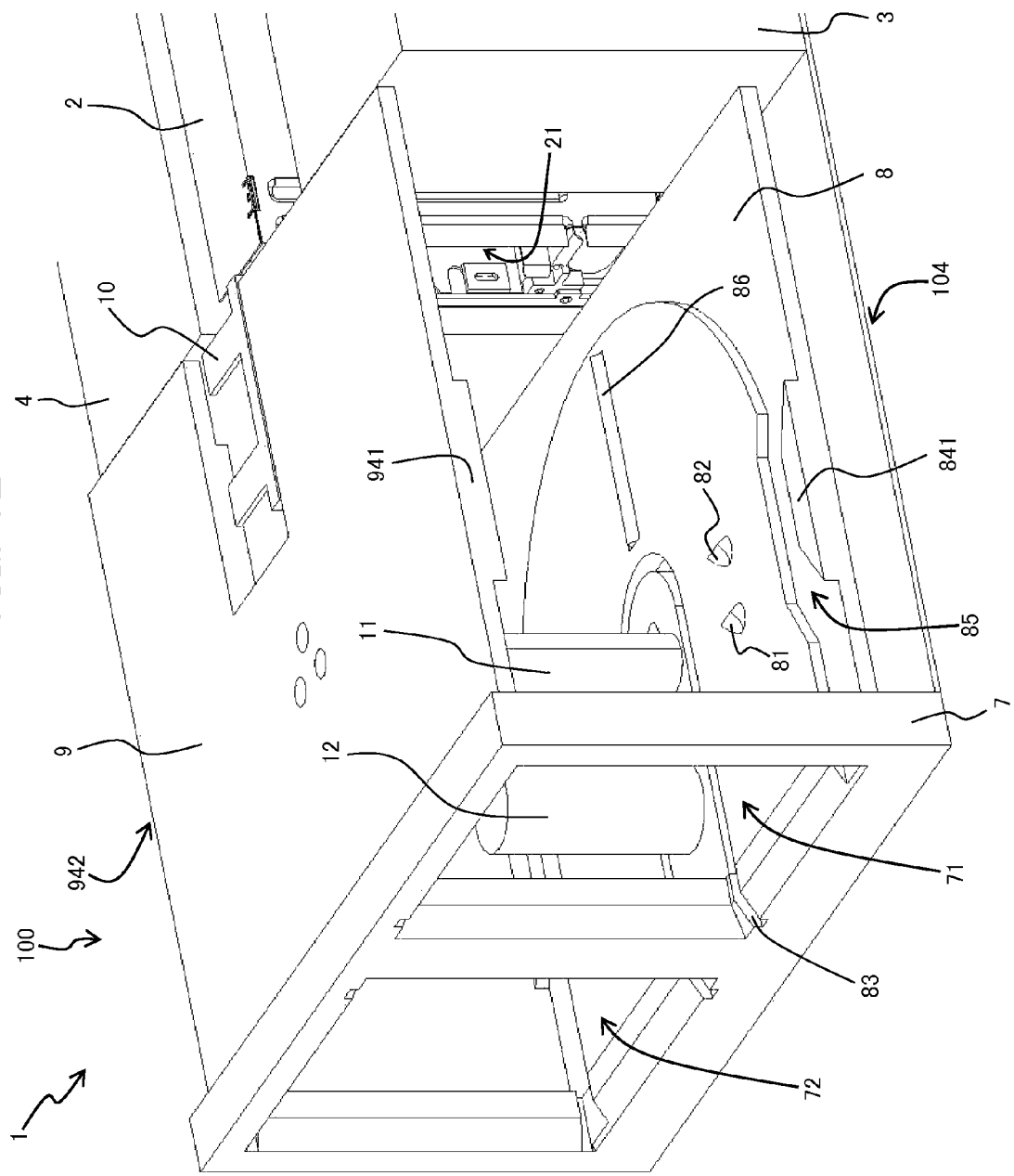
FIG. 12 is a partial perspective view illustrating an external appearance of a cartridge auto-loader according to an embodiment.
Figure 13:
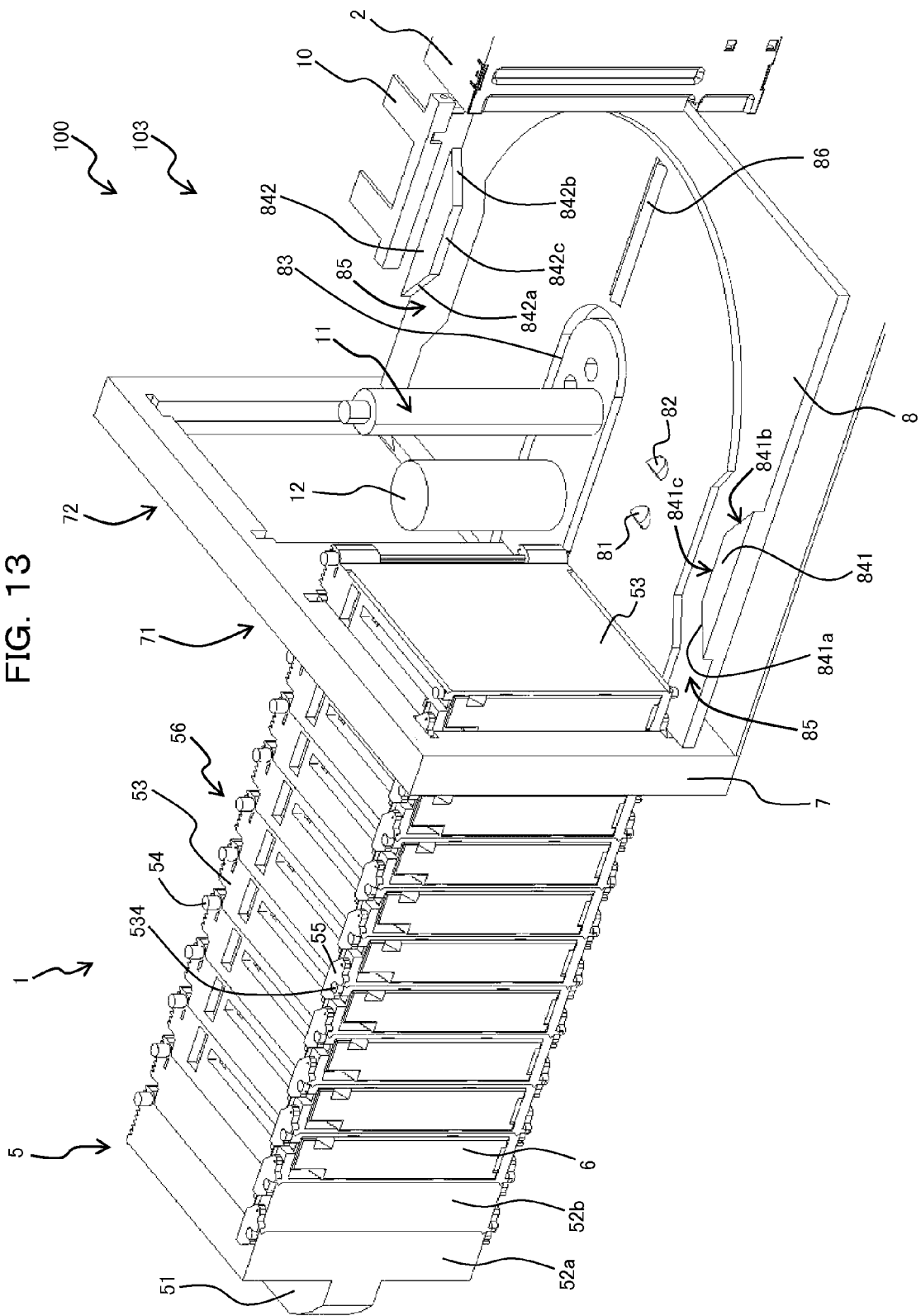
FIG. 13 is a partial perspective view illustrating a state in which a magazine is inserted into a cartridge auto-loader according to an embodiment.
Figure 14:
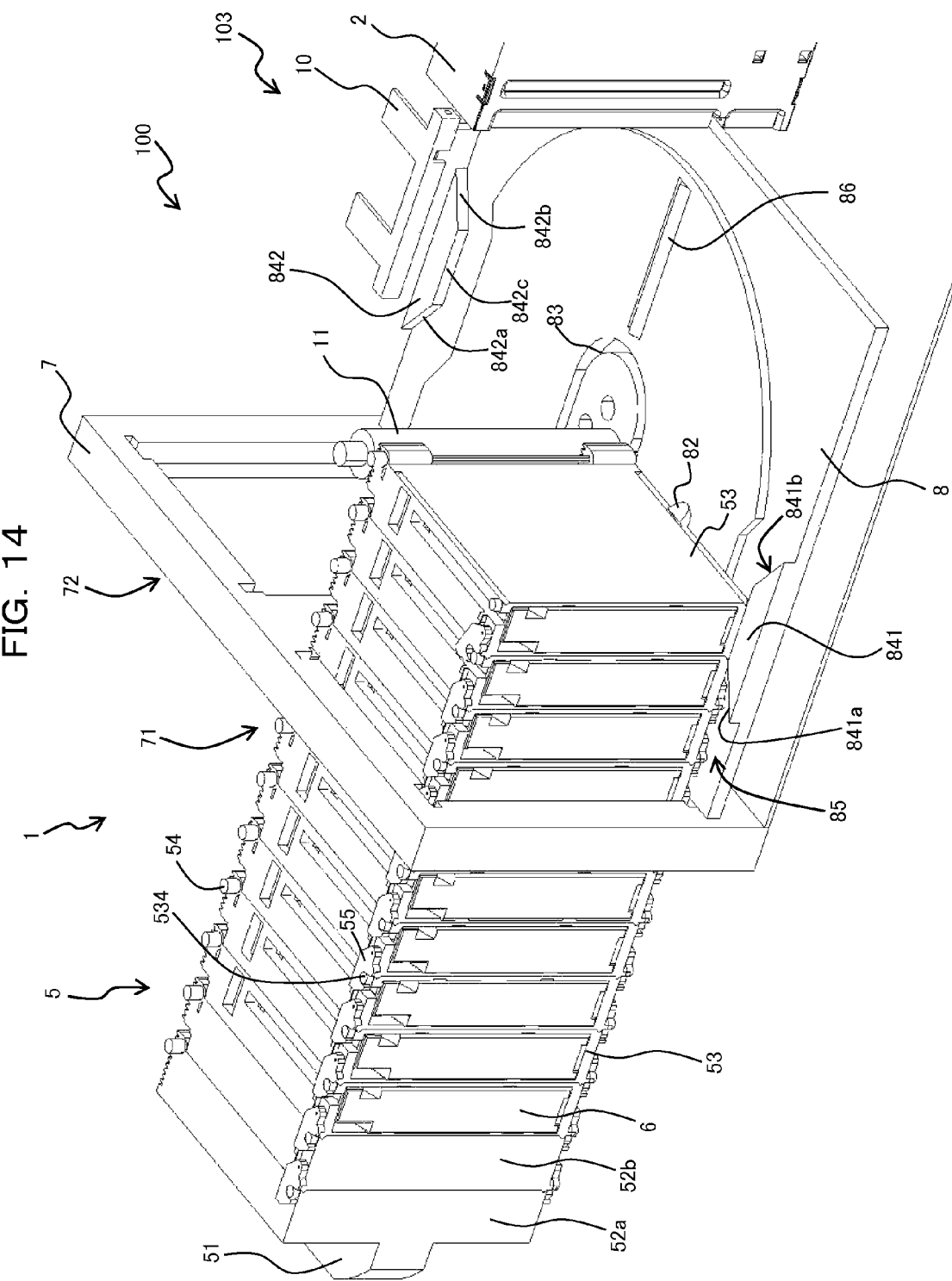
FIG. 14 is a partial perspective view illustrating a state in which a magazine is inserted into a cartridge auto-loader according to an embodiment.
Figure 15:
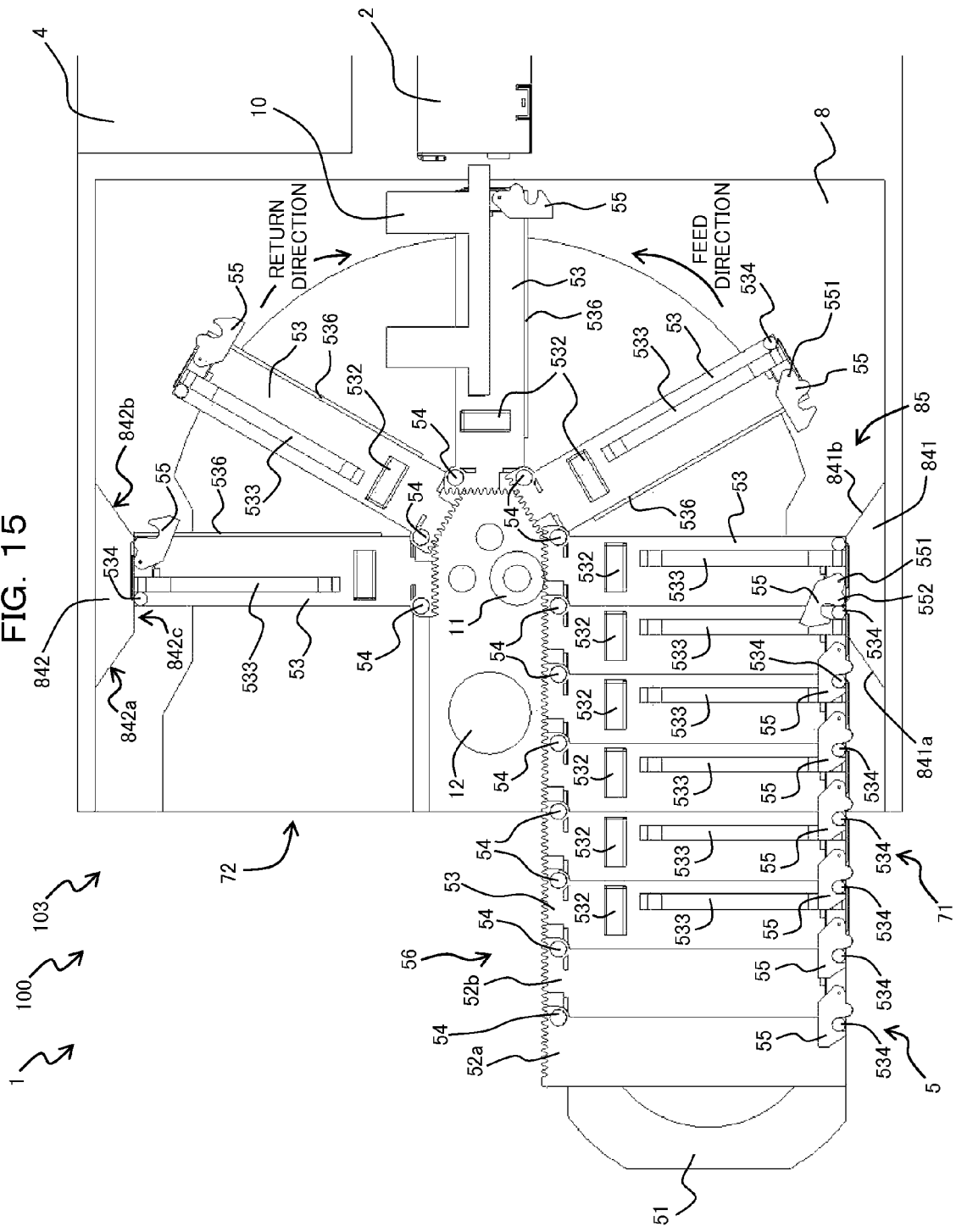
FIG. 15 is a plane perspective view of a cartridge auto-loader according to an embodiment.

FIG. 12 is a partial perspective view illustrating an external appearance of the cartridge auto-loader 100 according to the embodiment. Each of FIGS. 13 and 14 is a partial perspective view illustrating a state in which the magazine 5 is inserted into the cartridge auto-loader 100. In FIGS. 13 and 14, for convenience, illustration of the upper guide 9, the control unit 3, and the like is not provided. FIG. 15 is a plane perspective view of the cartridge auto-loader 100. In FIG. 15, for convenience, illustration of the upper guide 9, a front cover 7, the control unit 3, and the like is not provided as well.

The cartridge auto-loader 100 includes a conveyance mechanism 104 that conveys the magazine 5 to the inside of the housing 103 and the feeder mechanism 10 that feeds the tape cartridge 6 in the magazine cell 53 to the tape drive 2 as illustrated in FIG. 12.

The conveyance mechanism 104 includes the upper-guide 9, the lower guide 8, the magazine feed gear 11, and a magazine feed motor 12.

The housing 103 is configured as a box-like body including each of the lower guide 8, the upper guide 9, and the front cover 7 as one surface thereof. The lower guide 8 and the upper guide 9 are rectangular plate-like members, and arranged in parallel to face each other. The front cover 7 is arranged as a surface connecting the upper guide 9 with the lower guide 8.

Figure 21:
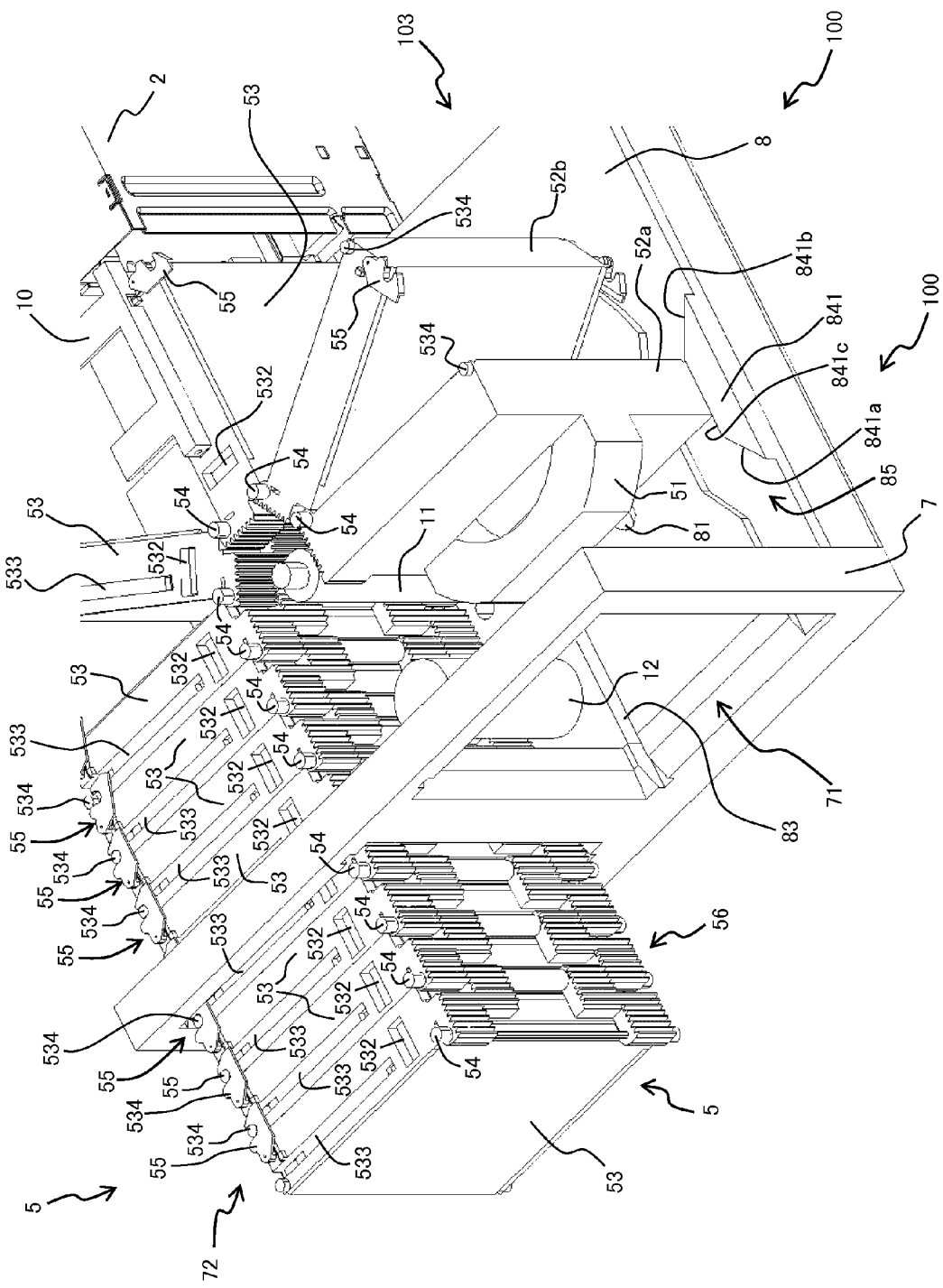
FIG. 21 is a partial perspective view illustrating a state of a magazine in a housing of a magnetic tape apparatus according to an embodiment.

The front cover 7 is arranged on the front surface of the magnetic tape apparatus 1. In the front cover 7, an insertion/extraction opening 71 and a protrusion opening 72 are formed to be adjacent to each other. The insertion/extraction opening 71 and the protrusion opening 72 are rectangular openings, and have a rectangular shape having a dimension larger than the external form of the side surface of the magazine cell 53 in the magazine 5 by a clearance. As a result, the magazine 5 being conveyed can pass through the insertion/extraction opening 71 and the protrusion opening 72, for example, as illustrated in FIGS. 13 and 21.

Figure 19:
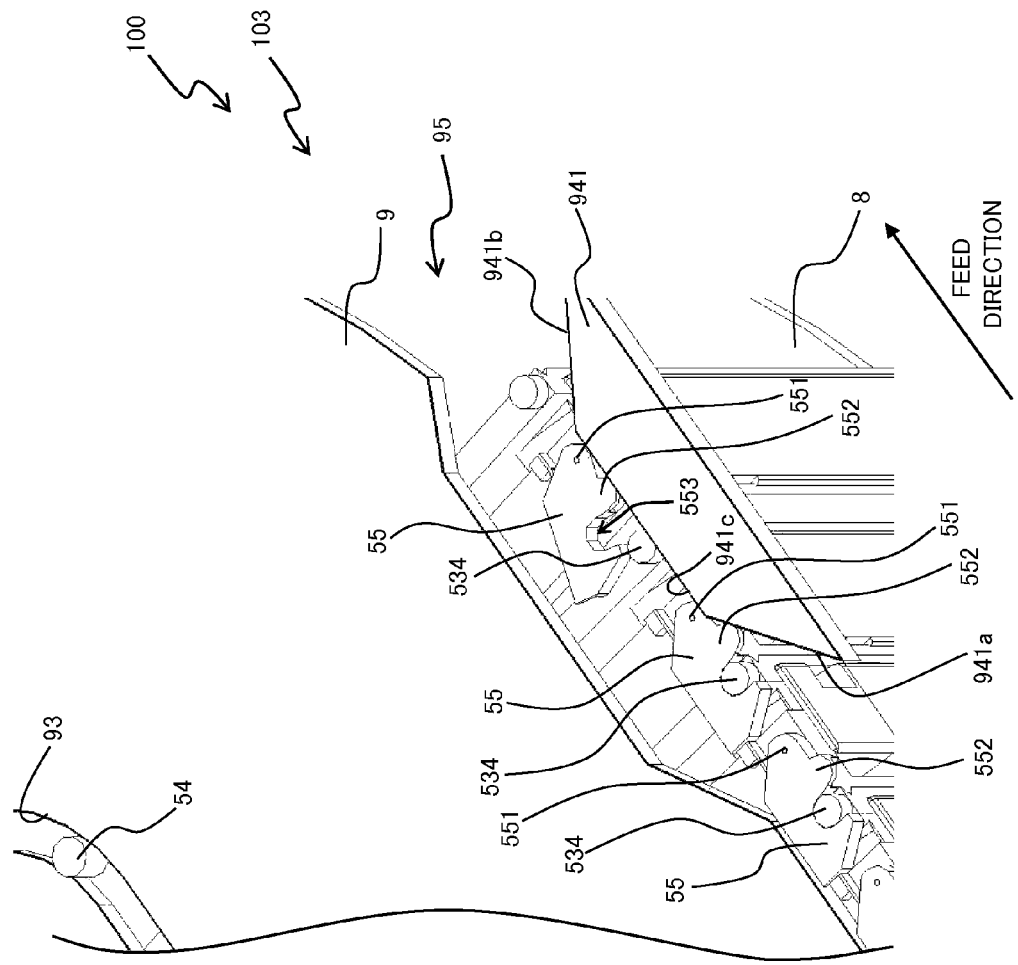
FIG. 19 is a partial perspective view for describing a function of a connection hook release block of a magnetic tape apparatus according to an embodiment.

As illustrated in, for example, FIG. 13, a connection shaft guide groove 83 and a connection hook guide groove 85 are formed in the lower guide 8. Further, for example, as illustrated in FIG. 19, a connection shaft guide groove 93 and a connection hook guide groove 95 are formed in the upper guide 9, similarly to the connection shaft guide groove 83 and the connection hook guide groove 85. In other words, in the housing 103, the connection shaft guide groove 93 of the upper guide 9 is formed to be plane-symmetrical to the connection shaft guide groove 83 of the lower guide 8. Further, the connection hook guide groove 95 of the upper guide 9 is formed to be plane-symmetrical to the connection hook guide groove 85 of the lower guide 8.

The connection shaft guide grooves 83 and 93 are grooves through which the connection shaft 54 of the magazine cell 53 passes, and the connection hook guide grooves 85 and 95 are grooves through which the connection hook 55 of the magazine cell 53 passes. In other words, in the cartridge auto-loader 100, when the magazine 5 is conveyed, the connection shaft 54 protruding downwards from the magazine cell 53 is guided to the connection shaft guide groove 83 of the lower guide 8. Further, the connection hook 55 arranged on the lower portion of the magazine cell 53 is guided to the connection hook guide groove 85 of the lower guide 8. Similarly, in the cartridge auto-loader 100, when the magazine 5 is conveyed, the connection shaft 54 protruding upwards from the magazine cell 53 is guided to the connection shaft guide groove 93 of the upper guide 9. Further, the connection hook 55 arranged on the upper portion of the magazine cell 53 is guided to the connection hook guide groove 95 of the upper guide 9.

The connection shaft guide grooves 83 and 93 and the connection hook guide grooves 85 and 95 cause the magazine 5 inserted through the insertion/extraction opening 71 in the housing 103 in the direction vertical to the insertion/extraction opening 71, and then rotate (turns around) the magazine 5 180°, and guide the magazines 5 to the protrusion opening 72. The magazine cells 53 protrude from the protrusion opening 72 starting from the first magazine cell 53 at the head of the magazine 5. In other words, the connection shaft guide grooves 83 and 93 and the connection hook guide grooves 85 and 95 connect the insertion/extraction opening 71 with the protrusion opening 72 to guide the magazine 5, and configure a curved latter U-shaped (an arc-like) guide path (a conveyance path). In the connection shaft guide grooves 83 and 93 and the connection hook guide grooves 85 and 95 configuring the U-shaped guide path, an end portion at the turn-around side forms an arc.

In other words, in the cartridge auto-loader 100, the magazine 5 is inserted through the insertion/extraction opening 71 of the front cover 7 in the horizontal direction. The magazine 5 inserted through the insertion/extraction opening 71 is conveyed along the arc-shaped guide path in the housing 103, and thus the magazine is turned around in the housing 103 and protrudes from the protrusion opening 72. Further, the magazine 5 having protruded from the protrusion opening 72 is conveyed in the direction opposite to the guide path, and discharged through the insertion/extraction opening 71. The user extracts the magazine 5 discharged from the insertion/extraction opening 71.

In the arc portion of the guide path, the consecutively hinge-connected magazine cells 53 configuring the magazine 5 becomes an unlock state in which each connection hook 55 positioned at the front surface side (the outer circumference side of the arc) is disengaged from the connection boss 534 of the adjacent magazine cell 53. As a result, for example, as illustrated in FIG. 15, in the arc portion of the guide path, the end portion of the magazine cell 53 at the front surface side is separated from another adjacent magazine cell 53, and the magazine cells 53 are radially spread.

Hereinafter, a direction from the insertion/extraction opening 71 to the protrusion opening 72 in the guide path from the insertion/extraction opening 71 to the protrusion opening 72 by the connection shaft guide grooves 83 and 93 and the connection hook guide grooves 85 and 95 as illustrated in FIG. 15 is referred to as a "feed direction". Further, a direction from the protrusion opening 72 to the insertion/extraction opening 71 in the guide path from the insertion/extraction opening 71 to the protrusion opening 72 is referred to as a "return direction".

In the housing 103, the magazine feed gear 11 and the magazine feed motor 12 are arranged in an area surrounded by the U-shaped connection shaft guide grooves 83 and 93.

The magazine feed motor 12 is a motor capable of rotationally driving the magazine feed gear 11, and controlled by the control unit 3.

The magazine feed gear 11 engages with the rack gear 56 arranged on the back surface of the magazine cell 53, and moves the engaged magazine cell 53 in the feed direction or the return direction. The rotation axis of the magazine feed gear 11 is vertically arranged between the lower guide 8 and the upper guide 9, and the magazine feed gear 11 is arranged at the position in the guide path at which the magazine cell 53 is conveyed in the closed state. In other words, the magazine feed gear 11 is arranged near the position at which the connection shaft guide grooves 83 and 93 and the connection hook guide grooves 85 and 95 form a straight line. Thus, the magazine feed gear 11 can engage with the rack gear 56 arranged on the back surface of the magazine cell 53.

The magazine feed motor 12 and the magazine feed gear 11 are connected through a transmission means such as a gear at the side opposite to the surface of the lower guide 8 on which the connection shaft guide groove 83 and the like are arranged, and driving force by the magazine feed motor 12 is transmitted to the magazine feed gear 11.

At the turn-around position of the U-shaped guide path, the tape drive 2 is arranged to face the guide path. Further, at the position of the lower guide 8 facing the insertion opening 21 of the tape drive 2, the positioning block 86 protrudes along the insertion/extraction direction of the tape cartridge 6 on the insertion opening 21. The positioning block 86 is fitted into the positioning groove 531 formed in the bottom surface of the magazine cell 53. As a result, the positioning block 86 fixes the magazine cell 53 at the position at which the insertion opening 535 faces the insertion opening 21 (see FIG. 12) of the tape drive 2 for the tape cartridge 6 in parallel with the insertion/extraction direction of the tape cartridge 6 into/from the tape drive 2. Hereinafter, there are cases in which the position at which the insertion opening 535 of the magazine cell 53 faces the insertion opening 21 of the tape drive 2 at the arc portion of the conveyance path is referred to as a "feed position".

The tape drive 2 is arranged at the position farthest from the front cover 7, facing the arc portion of the conveyance path of the magazine 5. Further, the tape drive 2 is arranged in a state in which the insertion opening 21 faces the front cover 7 side.

A magazine end sensor 81 is arranged at the position near the connection hook release blocks 841 and 941 which will be described later in an area of the lower guide 8 through which the magazine cell 53 passes. The magazine end sensor 81 is, for example, a push switch, and turned on when pushed by the bottom of the magazine cell 53 in a state in which the magazine cell 53 is passing through above the magazine end sensor 81. The magazine end sensor 81 detects the presence or absence of the magazine cell 53, and detects the tail end of the magazine 5.

A magazine set sensor 82 is arranged at the position that is near the connection hook release blocks 841 and 941 in the area of the lower guide 8 through which the magazine cell 53 passes and is arranged at a portion downstream in the feed direction with respect to the magazine end sensor 81 on the lower guide 8. Similarly to the magazine end sensor 81, the magazine set sensor 82 is, for example, a push switch, and turned on when pushed by the bottom of the magazine cell 53 in a state in which the magazine cell 53 is passing through above the magazine set sensor 82. The magazine set sensor 82 detects the presence or absence of the magazine cell 53, and detects that the magazine 5 has been inserted through the insertion opening 535.

The magazine end sensor 81 and the magazine set sensor 82 are not limited to a push switch, and for example, any other switch of a light detection type or the like may be used, and various modifications can be implemented.

In the lower guide 8, the connection hook release blocks 841 and 842 are formed in the connection hook guide groove 85.

The connection hook release blocks 841 and 842 come into contact with the protrusion 552 of the connection hook 55 of the magazine cell 53 moving in the connection hook guide groove 85, and causes the connection hook 55 to become the open state. The connection hook release blocks 841 and 842 come into contact with the protrusion 552 of the connection hook 55 of the magazine cell 53 moving in the connection hook guide groove 85 in one direction, and disengage the connection hook 55 from the connection boss 534. Further, the connection hook release blocks 841 and 842 come into contact with the protrusion 552 of the connection hook 55 of the magazine cell 53 moving in the direction opposite to one direction, and engage the connection hook 55 with the connection boss 534.

The connection hook release block 841 is arranged near a boundary between a straight line path starting from the insertion/extraction opening 71 and the arc portion along the straight line path in the guide path of the magazine 5 formed by the connection shaft guide groove 83 and the connection hook guide groove 85, for example, as illustrated in FIG. 13. Further, the connection hook release block 841 is arranged at the position facing the front surface of the magazine cell 53 in the connection hook guide groove 85.

The connection hook release block 841 comes into contact with the protrusion 552 of the connection hook 55 of the magazine cell 53 moving in the connection hook guide groove 85 in the feed direction, and disengages the connection hook 55 from the connection boss 534. Further, the connection hook release block 841 comes into contact with the protrusion 552 of the connection hook 55 of the magazine cell 53 moving in the connection hook guide groove 85 in the return direction, and engagers the connection hook 55 with the connection boss 534.

The connection hook release block 841 is formed as a block having a trapezoidal shape in the connection hook guide groove 85, and includes inclined surfaces 841a and 841b and a straight line surface 841c along the guide path, for example, as illustrated in FIG. 13. The inclined surface 841a is an inclined surface protruding toward the connection shaft guide groove 83 along the feed direction.

The inclined surface 841a pushes the protrusion 552 of the connection hook 55 attached to the lower side of the magazine cell 53 that is inserted through the insertion/extraction opening 71 and conveyed in the feed direction to the back surface side, and causes the connection hook 55 to become the open state. As a result, the connection boss 534 is disengaged (unlocked). Further, the inclined surface 841a guides the magazine cell 53 being conveyed in the feed direction to the straight line surface 841c while maintaining the connection hook 55 in the open state.

The inclined surface 841b is an inclined surface getting away from the connection shaft guide groove 83 along the feed direction, inversely with the inclined surface 841a. The inclined surface 841b pushes the protrusion 552 of the connection hook 55 attached to the bottom surface of the magazine cell 53 being conveyed in the return direction to the back surface side, and causes the connection hook 55 to become the open state. Further, the inclined surface 841b guides the magazine cell 53 being conveyed in the return direction to the straight line surface 841c while maintaining the connection hook 55 in the open state.

The straight line surface 841c is a surface connecting the inclined surface 841a with the inclined surface 841b, and is in parallel with the connection shaft guide groove 83. The magazine cell 53 being conveyed in the feed direction or the return direction is guided along the straight line surface 841c in the state in which the connection hook 55 is in the open state. In other words, the straight line surface 841c guides the magazine cell 53 being conveyed in the feed direction or the return direction in the state in which the protrusion 552 of the connection hook 55 attached to the bottom surface of the magazine cell 53 is pushed against the back surface side.

A feed direction side end portion of the straight line surface 841c is positioned to be closer to the tape drive 2 side than the arc center of the turn-around portion of the guide path, for example, as illustrated in FIGS. 13 to 15.

As a result, when the magazine 5 is conveyed in the feed direction, each magazine cell 53 enters the arc portion of the guide path in the state in which the connection hook 55 has become the open state by the straight line surface 841c. Further, in the arc portion, the front surface side end portions of the adjacent magazine cells 53 are separated from each other.

Meanwhile, when the magazine 5 is conveyed in the return direction, the front surface side end portion of each magazine cell 53 guided in the state in which the connection hook 55 has become the open state by the inclined surface 841b gets closer to that of another adjacent magazine cell 53 in the feed direction side end portion of the straight line surface 841c, and the magazine 5 becomes the closed state. Then, after passing through the straight line surface 841c, the magazine cell 53 being conveyed in the return direction becomes the closed state as the connection hook 55 is pushed to the front surface side through the connection hook spring 556. At this time, since each magazine cell 53 is in the closed state, the connection hook 55 engages with the connection boss 534 of another adjacent magazine cell 53 and becomes the lock state.

The connection hook release block 842 is arranged near a boundary between the straight line path starting from the insertion/extraction opening 71 and the arc portion along the straight line path in the guide path of the magazine 5 formed by the connection shaft guide groove 83 and the connection hook guide groove 85, for example, as illustrated in FIG. 13. Further, the connection hook release block 842 is arranged at the position facing the front surface of the magazine cell 53 in the connection hook guide groove 85.

The connection hook release block 842 comes into contact with the protrusion 552 of the connection hook 55 of the magazine cell 53 moving in the connection hook guide groove 85 in the return direction, and disengages the connection hook 55 from the connection boss 534 of the adjacent magazine cell 53. Further, the connection hook release block 842 comes into contact with the protrusion 552 of the connection hook 55 of the magazine cell 53 moving in the connection hook guide groove 85 in the feed direction, and engages the connection hook 55 with the connection boss 534 of the adjacent magazine cell 53.

The connection hook release block 842 is formed as a block having a trapezoidal shape in the connection hook guide groove 85, and includes inclined surfaces 842a and 842b and a straight line surface 842c along the guide path, for example, as illustrated in FIG. 13. The inclined surface 842a is an inclined surface protruding toward the connection shaft guide groove 83 along the return direction.

The inclined surface 842a pushes the protrusion 552 of the connection hook 55 attached to the bottom surface of the magazine cell 53 being conveyed in the return direction from the protrusion opening 72 to the back surface side, and causes the connection hook 55 to become the open state. As a result, the connection hook 55 is disengaged (unlocked) from the connection boss 534. Further, the inclined surfaces 842a guides the magazine cell 53 being conveyed in the return direction to the straight line surface 842c while maintaining the connection hook 55 in the open state.

The inclined surfaces 842b is an inclined surface getting away from the connection shaft guide groove 83 along the return direction, inversely with the inclined surface 842a. The inclined surfaces 842b pushes the protrusion 552 of the connection hook 55 attached to the bottom surface of the magazine cell 53 being conveyed in the feed direction to the back surface side, and causes the connection hook 55 to become the open state. Further, the inclined surfaces 842b guides the magazine cell 53 being conveyed in the feed direction to the straight line surface 842c while maintaining the connection hook 55 in the open state.

The straight line surface 842c is a surface connecting the inclined surfaces 842a with the inclined surfaces 842b, and is in parallel with the connection shaft guide groove 83. The magazine cell 53 being conveyed in the feed direction or the return direction is guided along the straight line surface 842c in the state in which the connection hook 55 is in the open state. In other words, the straight line surface 842c guides the magazine cell 53 being conveyed in the feed direction or the return direction in the state in which the protrusion 552 of the connection hook 55 attached to the bottom surface of the magazine cell 53 is pushed against the back surface side.

A return direction side end portion of the straight line surface 842c is positioned to be closer to the tape drive 2 side than the arc center of the turn-around portion of the guide path, for example, as illustrated in FIGS. 13 to 15.

As a result, when the magazine 5 is conveyed in the return direction, each magazine cell 53 enters the arc portion of the guide path in the state in which the connection hook 55 has become the open state by the straight line surface 842c. Further, in the arc portion, the front surface side end portions of the adjacent magazine cells 53 are separated from each other.

Meanwhile, when the magazine 5 is conveyed in the feed direction, the front surface side end portion of each magazine cell 53 guided in the state in which the connection hook 55 has become the open state by the inclined surfaces 842b gets closer to that of another adjacent magazine cell 53 in the return direction side end portion of the straight line surface 842c, and the magazine 5 becomes the closed state. Then, after passing through the straight line surface 842c, the magazine cell 53 being conveyed in the feed direction becomes the closed state as the connection hook 55 is pushed to the front surface side through the connection hook spring 556. At this time, since each magazine cell 53 is in the closed state, the connection hook 55 engages with the connection boss 534 of another adjacent magazine cell 53 and becomes the lock state.

Even in the upper guide 9, similarly to the connection hook release blocks 841 and 842 of the lower guide 8, the connection hook release blocks 941 and 942 are formed in the connection hook guide groove 95.

The connection hook release blocks 941 and 942 come into contact with the protrusion 552 of the connection hook 55 of the magazine cell 53 moving in the connection hook guide groove 95, and causes the connection hook 55 to become the open state. The connection hook release blocks 941 and 942 come into contact with the protrusion 552 of the connection hook 55 of the magazine cell 53 moving in the connection hook guide groove 95 in one direction, and disengage the connection hook 55 from the connection boss 534. Further, the connection hook release blocks 941 and 942 come into contact with the protrusion 552 of the connection hook 55 of the magazine cell 53 moving in the direction opposite to one direction, and engage the connection hook 55 with the connection boss 534.

Figure 16:
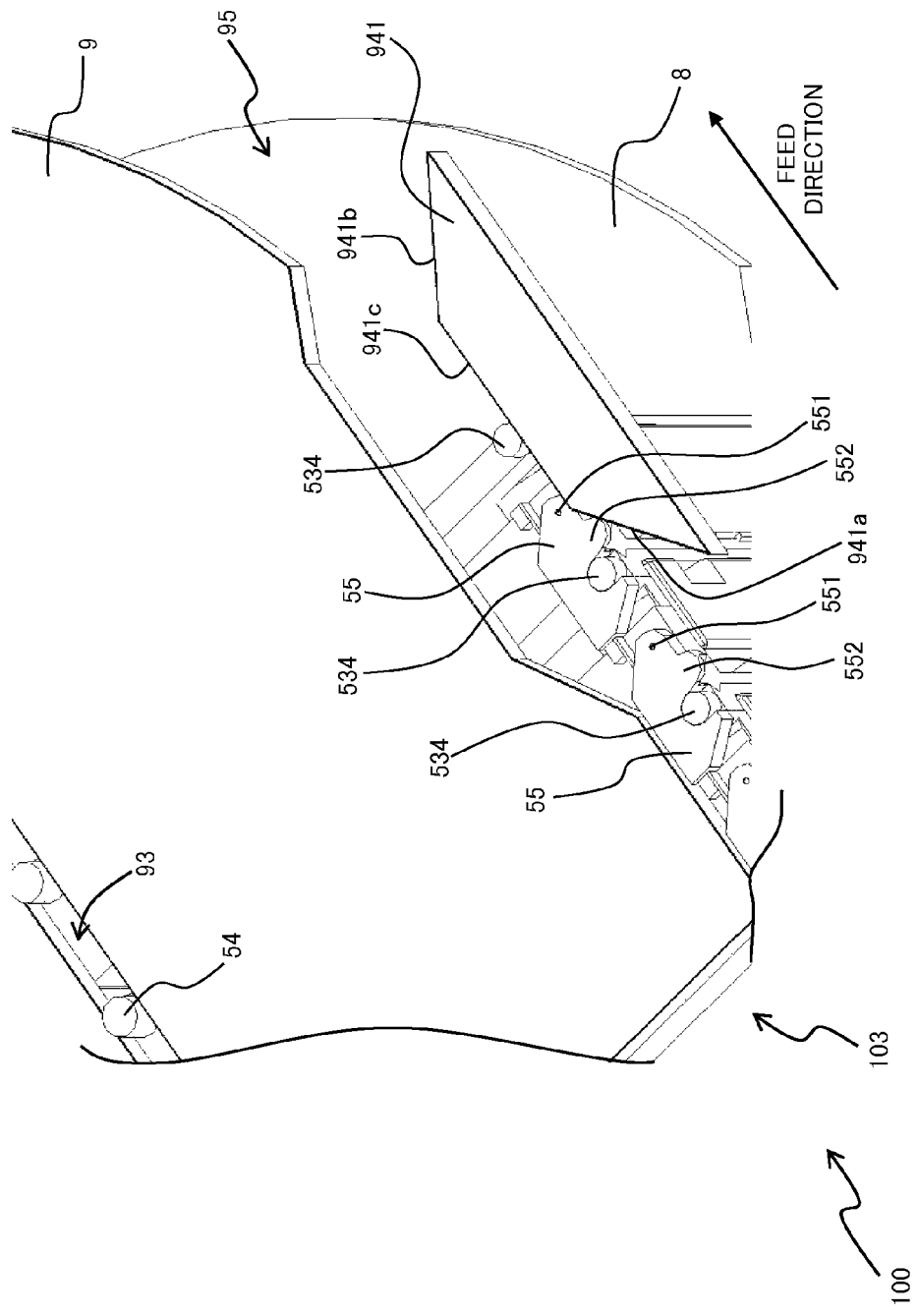
FIG. 16 is a partial perspective view for describing a function of a connection hook release block of a magnetic tape apparatus according to an embodiment.

The connection hook release block 941 is formed at the position facing the connection hook release block 841 in the upper guide 9. In other words, the connection hook release block 941 is arranged near a boundary between a straight line path starting from the insertion/extraction opening 71 and the arc portion along the straight line path in the guide path of the magazine 5 formed by the connection shaft guide groove 93 and the connection hook guide groove 95, for example, as illustrated in FIG. 16. Further, the connection hook release block 941 is arranged at the position facing the front surface of the magazine cell 53 in the connection hook guide groove 95.

The connection hook release block 941 comes into contact with the protrusion 552 of the connection hook 55 of the magazine cell 53 moving in the connection hook guide groove 95 in the feed direction, and disengages the connection hook 55 from the connection boss 534. Further, the connection hook release block 941 comes into contact with the protrusion 552 of the connection hook 55 of the magazine cell 53 moving in the connection hook guide groove 95 in the return direction, and engages the connection hook 55 with the connection boss 534.

The connection hook release block 941 is formed as a block having a trapezoidal shape in the connection hook guide groove 95, and includes inclined surfaces 941a and 941b and a straight line surface 941c along the guide path, for example, as illustrated in FIG. 16. The inclined surfaces 941a and 941b and the straight line surface 941c have the same configuration and operation as the inclined surfaces 841a and 841b and the straight line surface 841c of the connection hook release block 841, and thus a description thereof is not provided.

The connection hook release block 942 is arranged near a boundary between a straight line path ending at the protrusion opening 72 after passing through the arc portion and the arc portion along the straight line path in the guide path of the magazine 5 formed by the connection shaft guide groove 93 and the connection hook guide groove 95, for example, as illustrated in FIG. 12. Further, the connection hook release block 942 is arranged at the position facing the front surface of the magazine cell 53 in the connection hook guide groove 85.

The connection hook release block 942 comes into contact with the protrusion 552 of the connection hook 55 of the magazine cell 53 moving in the connection hook guide groove 95 in the return direction, and disengages the connection hook 55 from the connection boss 534 of the adjacent magazine cell 53. Further, the connection hook release block 942 comes into contact with the protrusion 552 of the connection hook 55 of the magazine cell 53 moving in the connection hook guide groove 95 in the feed direction, and engages the connection hook 55 with the connection boss 534 of the adjacent magazine cell 53.

The connection hook release block 942 has the same configuration and operation as the connection hook release block 842, and thus a description thereof is not provided.

Further, in the housing 103, the feeder mechanism 10 is arranged above the positioning block 86.

The feeder mechanism 10 is a medium moving unit moves the tape cartridge 6 between the magazine cell 53 and the tape drive 2. The feeder mechanism 10 causes the tape cartridge 6 stored in the magazine cell 53 to be inserted into the tape drive 2, and causes the tape cartridge 6 discharged from the tape drive 2 to be stored in the magazine cell 53. The feeder mechanism 10 causes a claw (not illustrated) to engage with a groove 62 (see FIG. 6) formed in the tape cartridge 6 through the feeder passage groove 533 formed in the top surface of the magazine cell 53. Further, by moving the claw along the feeder passage groove 533, the feeder mechanism 10 moves the tape cartridge 6 between the magazine cell 53 and the tape drive 2.

[Operation and Effects]

In the magnetic tape apparatus 1 having the above-described configuration according to the embodiment, data access to the tape cartridge 6 is performed as follows.

(1) Preparation for Magazine

First, an arbitrary number of magazine cells 53 corresponding to the number of tape cartridges 6 to be used are prepared, and the magazine cells 53 are hinge-connected to be a string of magazine cells 53 by the connection shaft 54 at the back surface side (for example, see FIG. 7). Further, the dummy cells 52a and 52b are hinge-connected to the end portion at the opposite side in the consecutive direction in the string of magazine cells 53. As a result, the magazine 5 in which the plurality of magazine cells 53 are integrally connected is made as illustrated in FIGS. 3 and 4. The operator stores the tape cartridge 6 in a certain magazine cell 53 through the insertion opening 535.

Hereinafter, there are cases in which the magazine cell 53 positioned at the side opposite to the dummy cell 52a in the magazine 5, that is, the magazine cell 53 at the head in the consecutive direction is referred to as a "head magazine cell 53". Further, there are cases in which the magazine cell 53 adjacent to the dummy cell 52b in the magazine 5, that is, the magazine cell 53 at the tail end in the consecutive direction is referred to as a "tail end magazine cell 53".

For example, when the tape cartridge 6 is already stored in the tape drive 2, and the tape cartridge 6 is replaced, at least one magazine cell 53 does not store the tape cartridge 6 and is kept empty.

As illustrated in FIGS. 3 and 4, in the state in which the magazine 5 is closed, in each magazine cell 53, the connection hook 55 engages with the connection boss 534 of the adjacent magazine cell 53 and becomes the lock state. Further, in the magazine 5, between the adjacent magazine cells 53, the lateral deviation preventing convex portion 536 formed on the side surface of one of the adjacent magazine cells 53 is inserted into and engages with the lateral deviation preventing concave portion 537 formed on the side surface of the opposite other magazine cell 53. As a result, in the closed state, it is possible to stably hand the magazine 5 without a phenomenon that the magazine cells 53 come off or are deviated and thus separated.

(2) Loading of Magazine

The user inserts the magazine 5 having the above configuration into the insertion/extraction opening 71 formed in the front cover 7 of the cartridge auto-loader 100 starting from the head magazine cell 53 as illustrated in FIG. 13.

In the cartridge auto-loader 100, when the magazine 5 is inserted through the insertion/extraction opening 71 in the feed direction, the rack gear 56 arranged on the back surface of the inserted magazine 5 meshes with the magazine feed gear 11 in the auto-loader 100 as illustrated in FIG. 14. Further, the bottom surface of the magazine 5 pushes the magazine set sensor 82 installed in the conveyance path. When it is detected that the magazine set sensor 82 is turned on, the control unit 3 causes the magazine feed gear 11 to be rotationally driven in the feed direction through the magazine feed motor 12. As a result, the magazine 5 is conveyed in the feed direction and enters the housing 103.

Figure 22:
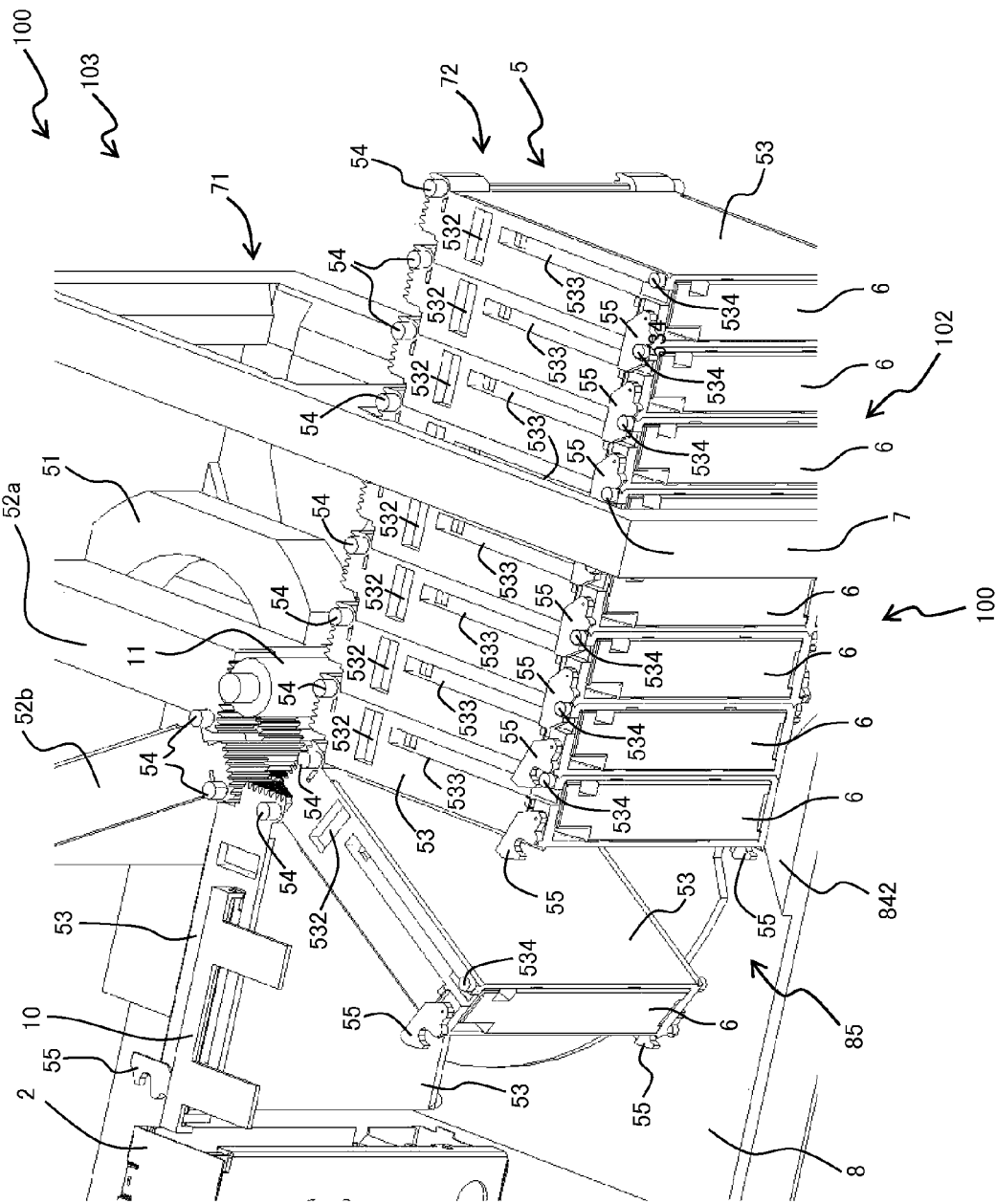
FIG. 22 is a partial perspective view illustrating a state of a magazine in a housing of a magnetic tape apparatus according to an embodiment.

FIGS. 16 to 20 are partial perspective views for describing the function of the connection hook release block 941 of the magnetic tape apparatus 1 according to the embodiment, and FIGS. 21 and 22 are partial perspective views illustrating the states of the magazine 5 in the housing 103. In FIGS. 16 to 22, for convenience, illustration of some components is not provided. Further, in FIGS. 16 to 20, only the connection hook release block 941 is illustrated, but it goes without saying that the same operation is performed even in the connection hook release block 841.

As illustrated in FIG. 16, in the magazine cell 53 being conveyed along the conveyance path in the feed direction, the connection hooks 55 arranged on the top surface and the bottom surface come into contact with the inclined surfaces 941a and 841a of the connection hook release blocks 941 and 841 through the protrusions 552. As the magazine cell 53 is conveyed in the feed direction, the protrusion 552 moves in the feed direction while being pushed toward the back surface side by the inclined surfaces 941a and 841a.

Figure 17:
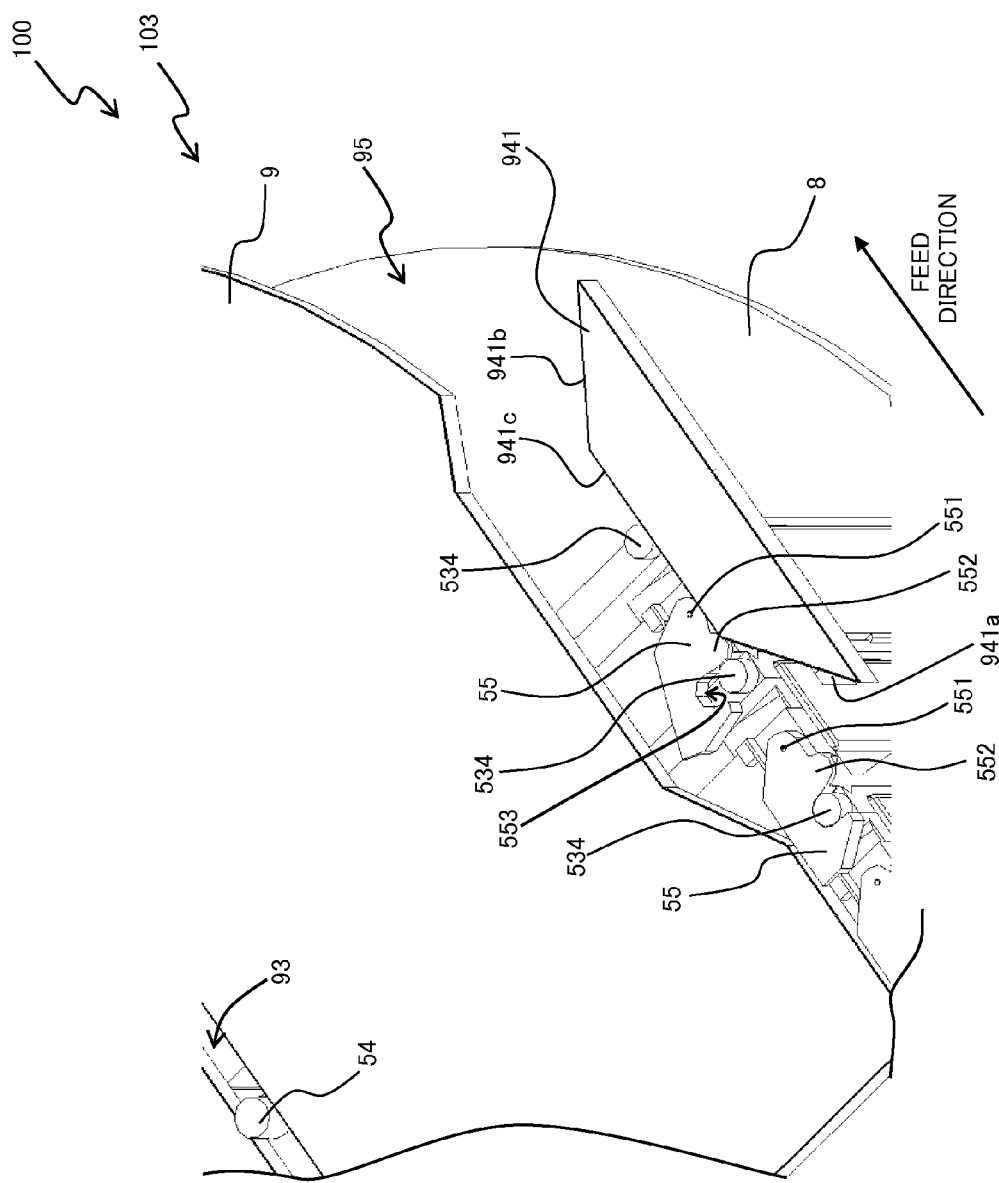
FIG. 17 is a partial perspective view for describing a function of a connection hook release block of a magnetic tape apparatus according to an embodiment.

As the protrusions 552 are pushed toward the back surface side of the magazine cell 53 through the inclined surfaces 941a and 841a, the connection hooks 55 moving in the feed direction along the inclined surfaces 941a and 841a rotate on the shafts 551, and thus a gap occurs between the concave portion 553 and the connection boss 534 that are in the lock state as illustrated in FIG. 17. This gap increases as the magazine cell 53 moves in the feed direction as illustrated in FIG. 17.

Then, the connection hooks 55 are guided along the inclined surfaces 941a and 841a, and become the open state when the protrusions 552 arrive at the straight line surfaces 941c and 841c.

Figure 18:
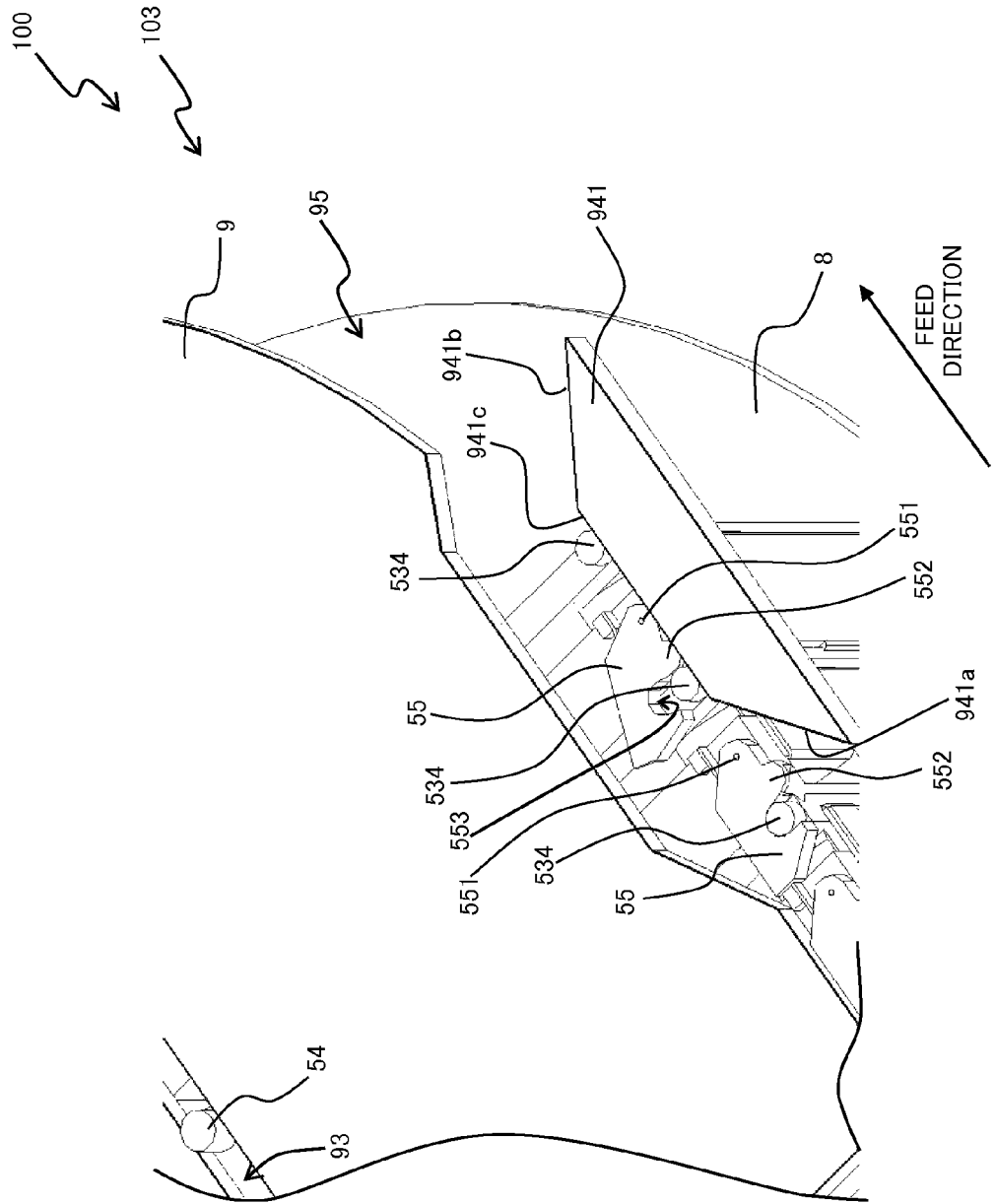
FIG. 18 is a partial perspective view for describing a function of a connection hook release block of a magnetic tape apparatus according to an embodiment.

Thereafter, the magazine cell 53 is conveyed in the feed direction in the state in which the connection hooks 55 are maintained in the unlock state by the straight line surfaces 941c and 841c as illustrated in FIGS. 18 and 19. Further, while the magazine cell 53 is being conveyed in the state in which the connection hooks 55 come into contact with the straight line surfaces 941c and 841c of the connection hook release blocks 941 and 841, the magazine cell 53 enters the arc portion of the conveyance path, and so the front surface side end portions of the adjacent magazine cells 53 are apart from each other. As a result, while the magazine cell 53 is being conveyed in the state in which the connection hooks 55 come into contact with the straight line surfaces 941c and 841c of the connection hook release blocks 941 and 841, the concave portion 553 is disengaged (unlocked) from the connection boss 534 as illustrated in FIG. 19. Thus, the magazine cell 53 is able to rotate on the connection shaft 54.

Figure 20:
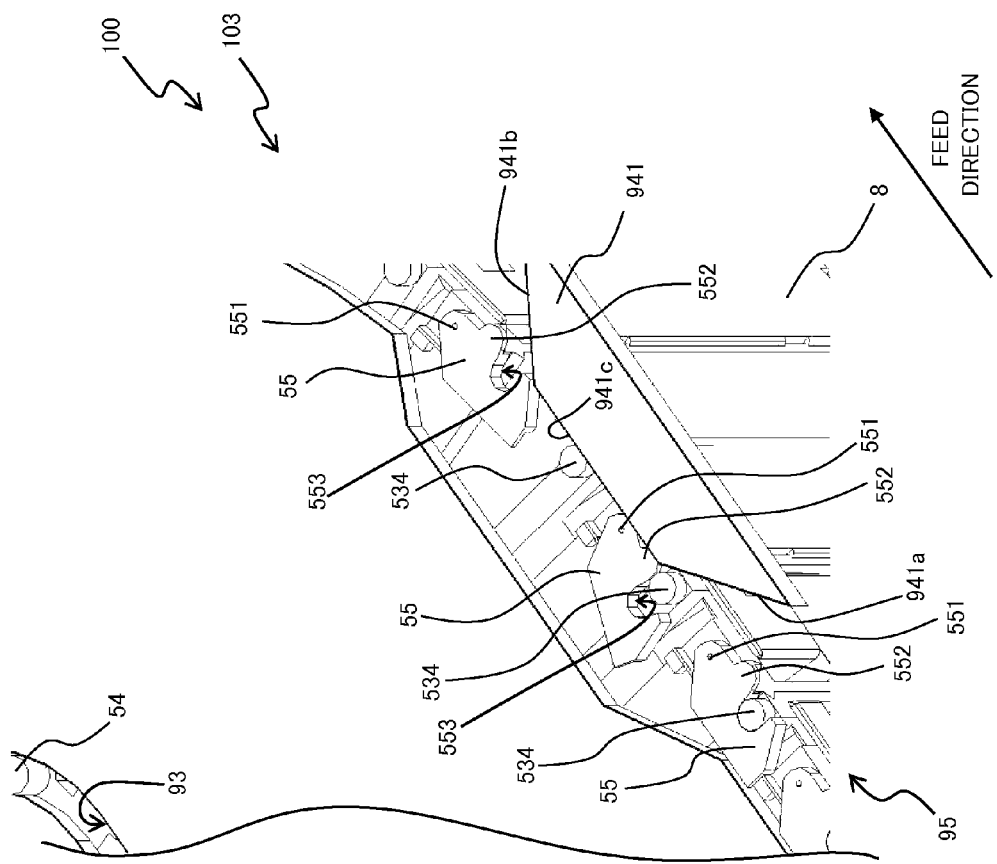
FIG. 20 is a partial perspective view for describing a function of a connection hook release block of a magnetic tape apparatus according to an embodiment.

When the magazine cell 53 is further conveyed toward the arc portion of the conveyance path in the feed direction, the front surface side of the magazine cell 53 is rotated along the arc-like conveyance path, and a gap between the front surface side end portions of the adjacent magazine cells 53 increases as illustrated in FIG. 20.

When the magazine 5 is further conveyed in the feed direction, the rotation is performed while the front surface side end portions of the magazine cells 53 are radially spread along the connection shaft guide grooves 83 and 93 formed in the lower guide 8 and the upper guide 9 (see FIG. 15).

For example, when the magazine cell 53 storing the tape cartridge 6 of the access target arrives in front of the tape drive 2 in the arc portion of the conveyance path, the control unit 3 controls the magazine feed motor 12 such that the magazine feed gear 11 is stopped as illustrated in FIG. 21. At this position, positioning the magazine cell 53 is performed such that the positioning block 86 protruding from the lower guide 8 is fitted into the positioning groove 531 formed on the bottom thereof. As a result, the magazine cell 53 is positioned at the feed position so that the insertion opening 535 faces the insertion opening 21 of the tape drive 2. The example illustrated in FIG. 21 illustrates a state in which the third magazine cell 53 from the head is at the feed position.

After the magazine cell 53 is positioned in front of the insertion opening 21 of the tape drive 2 (at the feed position), the control unit 3 then moves the tape cartridge 6 between the magazine cell 53 and the tape drive 2 through the feeder mechanism 10. In other words, the tape cartridge 6 in the magazine cell 53 is moved to and mounted in the tape drive 2, or the tape cartridge 6 in the tape drive 2 is unmounted and moved to the magazine cell 53.

For example, the tape cartridge 6 that has been subjected on the data access process performed the tape drive 2 is returned to the magazine cell 53 through the feeder mechanism 10.

Then, similarly, the magazine cell 53 of the next access target is conveyed through the magazine feed motor 12 and the magazine feed gear 11 until arriving at the feed position, and positioning the magazine cell 53 and moving the tape cartridge 6 by the feeder mechanism 10 are performed.

When the magazine cell 53 is further conveyed in the feed direction, the front surface side end portions of the magazine cells 53 that have been apart from the adjacent magazine cells 53 in the arc portion of the conveyance path get closer to each other so that the magazine 5 is closed in the process of entering the straight line path from the arc portion of the conveyance path.

Then, the conveying continues such that the protrusions 552 of the connection hooks 55 of the magazine cell 53 moving in the connection hook guide groove 85 in the feed direction are guided along the connection hook release blocks 942 and 842. Then, after passing through the straight line surfaces 942c and 842c of the connection hook release blocks 942 and 842, the connection hooks 55 engages with the connection bosses 534 of the adjacent magazine cell 53.

The engaged neighboring magazine cells 53 are fixed as the connection hook 55 engages with the connection boss 534, and, for example, a problem in that the magazine 5 is opened during the conveyance does not occur.

Of the engaged neighboring magazine cells 53, the lateral deviation preventing convex portion 536 formed on the side surface of one magazine cell 53 is inserted into and engages with the lateral deviation preventing concave portion 537 formed on the side surface of the opposite other magazine cell 53. As a result, a phenomenon that the magazine cells 53 come off and are separated from each other is prevented.

Further, when the magazine cells 53 are consecutively conveyed in the feed direction, the magazine cells 53 are extruded from the protrusion opening 72 of the front cover 7 in order starting from the head magazine cell 53 as illustrated in FIG. 21.

Then, when the magazine 5 is conveyed in the feed direction and the tail end magazine cell 53 arrives at the feed position, the magazine end sensor 81 installed in the lower guide 8 is turned off, and the control unit 3 detects that the tail end magazine cell 53 is at the feed position. In this state, the magazine 5 is conveyed as the magazine feed gear 11 meshes with the rack gear 56 of the dummy cell 52a.

Here, it is assumed that data access to the tape cartridge 6 stored in the tail end magazine cell 53 have been completed, and then the magazine 5 is extracted.

When the tape cartridge 6 is returned to the tail end magazine cell 53 through the feeder mechanism 10, the control unit 3 controls the magazine feed motor 12 such that the magazine feed gear 11 is inversely rotated, and the magazine 5 is conveyed in the return direction.

When the magazine 5 is conveyed in the return direction, the protrusions 552 of the connection hooks 55 of the magazine cell 53 moving in the connection hook guide groove 85 in the return direction come into contact with the connection hook release blocks 942 and 842, and disengage the connection hooks 55 from the connection bosses 534 of the adjacent magazine cell 53 as illustrated in FIG. 22.

The disengaging of the connection hooks 55 from the connection bosses 534 by the connection hook release blocks 942 and 842 at the time of the conveyance in the return direction is performed similarly to the disengaging of the connection hooks 55 from the connection bosses 534 by the connection hook release blocks 941 and 841 at the time of the conveyance in the feed direction.

Thereafter, after the magazine 5 passes through the arc portion of the conveyance path in the return direction, the protrusions 552 of the connection hooks 55 of the magazine cell 53 are guided to the connection hook release blocks 941 and 841. After passing through the straight line surfaces 941c and 841c of the connection hook release blocks 941 and 841, the connection hooks 55 engage with the connection bosses 534 of the adjacent magazine cell 53.

The engaged neighboring magazine cells 53 are fixed as the connection hooks 55 are fitted into the connection bosses 534, and, for example, a problem in that the magazine is opened during the conveyance does not occur. Further, of the engaged neighboring magazine cells 53, the lateral deviation preventing convex portion 536 formed on the side surface of one magazine cell 53 is inserted into and engages with the lateral deviation preventing concave portion 537 formed on the side surface of the opposite other magazine cell 53. As a result, a phenomenon that the magazine cells 53 come off and are separated from each other is prevented.

Further, the magazine 5 is conveyed in the return direction, and the magazine 5 in the closed state is discharged from the insertion/extraction opening 71. When the magazine set sensor 82 detects the off state, the control unit 3 stops the magazine feed gear 11 from being rotationally driven by the magazine feed motor 12. The user extracts the magazine 5 through the insertion/extraction opening 71.

As described above, in the magnetic tape apparatus 1 including the cartridge auto-loader 100 according to the embodiment, the magazine 5 is inserted in the horizontal direction through the insertion/extraction opening 71 of the housing 103. Further, the magazine 5 is configured such that a plurality of magazine cells 53 are consecutively hinge-connected at the back surface. Further, the magazine 5 inserted through the insertion/extraction opening 71 is conveyed along the arc-like guide path in the housing 103, turned around in the housing 103, and protrudes through the protrusion opening 72. Thus, the magazine 5 does not move in the vertical direction of the apparatus 1, there is no dead space in the upper portion and the lower portion of the apparatus 1, and thus space efficiency is improved. In other words, when the present apparatus 1 is of a rack mount type, it is possible to implement space saving and efficiently use the rack space.

Further, even in the horizontal direction, a dimension of the apparatus in the depth direction can be reduced, and thus the space efficiency can be improved.

As the magazine 5 is configured such that an arbitrary number of magazine cells 53 are connected through the connection shaft 54, it is possible to arbitrarily change the number of magazine cells 53 to be used, and it is possible not only to increase expandability and convenience but also to operate the magazine 5 economically and efficiently.

Further, in the magazine 5 configured such that a plurality of magazine cells 53 are hinge-connected at the back surface, the adjacent magazine cell 53 can be connected using the connection hook 55 and the connection boss 534 arranged at the front surface side. Thus, it is possible to stably handle the magazine 5 in the closed state, and the convenience is high.

Further, in the cartridge auto-loader 100, the connection hook release blocks 841, 842, 941, and 942 are formed at the position before the magazine 5 being conveyed arrives at the arc portion in the conveyance path of the magazine 5 having the arc portion. The connection hook release blocks 841, 842, 941, and 942 cause the connection hooks 55 of the magazine cell 53 to become the open state in front of the arc portion of the conveyance path, and unlock the magazine cell 53. Thus, the magazine 5 can be bent through the connection shaft 54 along the arc portion of the conveyance path, and the magazine 5 can be conveyed along the guide path having the arc shape.

(B) Modified Example

The present invention is not limited to the above embodiment, and various modifications can be made within a range not departing from the gist of the present invention.

Figure 23:
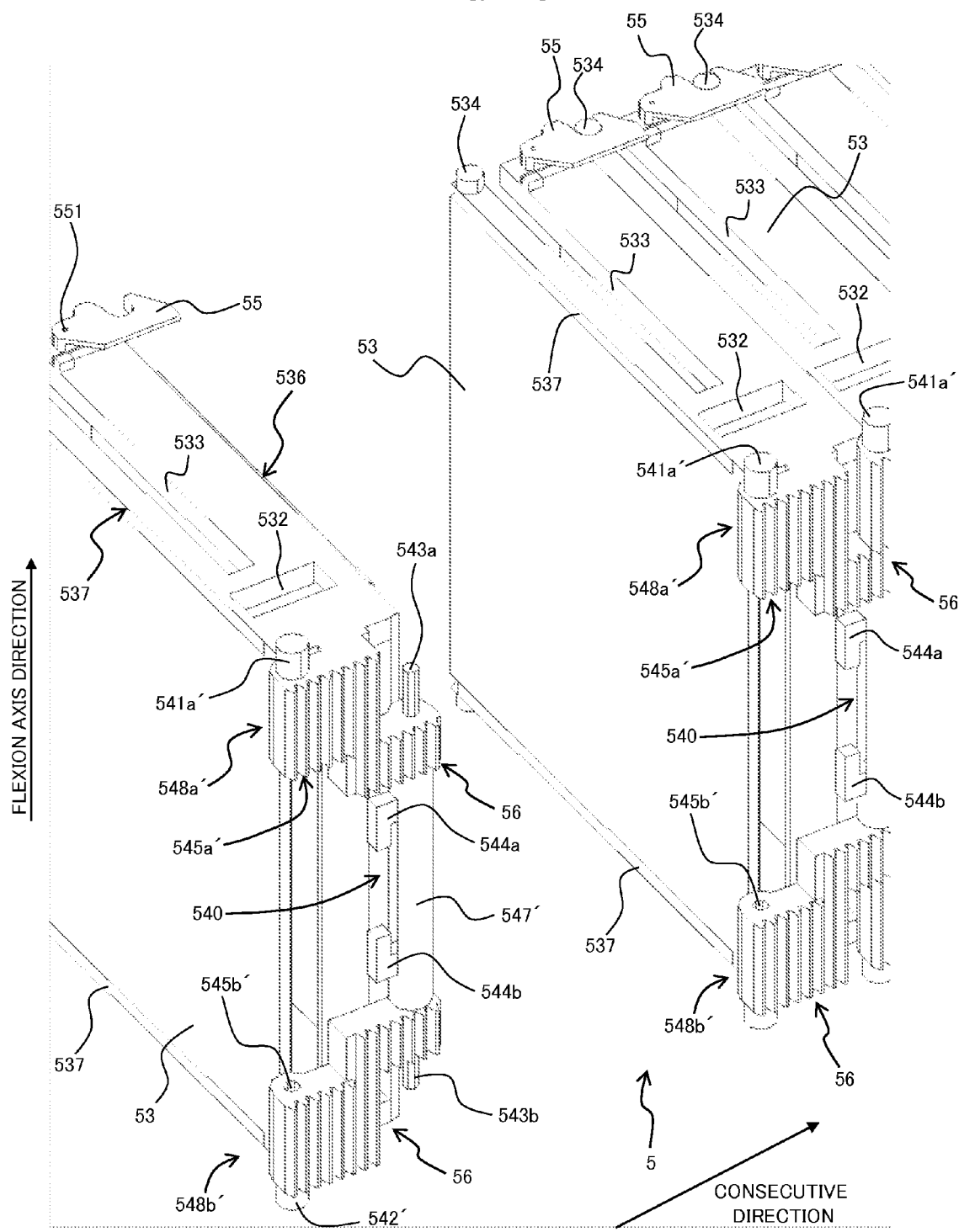
FIG. 23 is a diagram illustrating a magazine according to a modified example of an embodiment.
Figure 24:
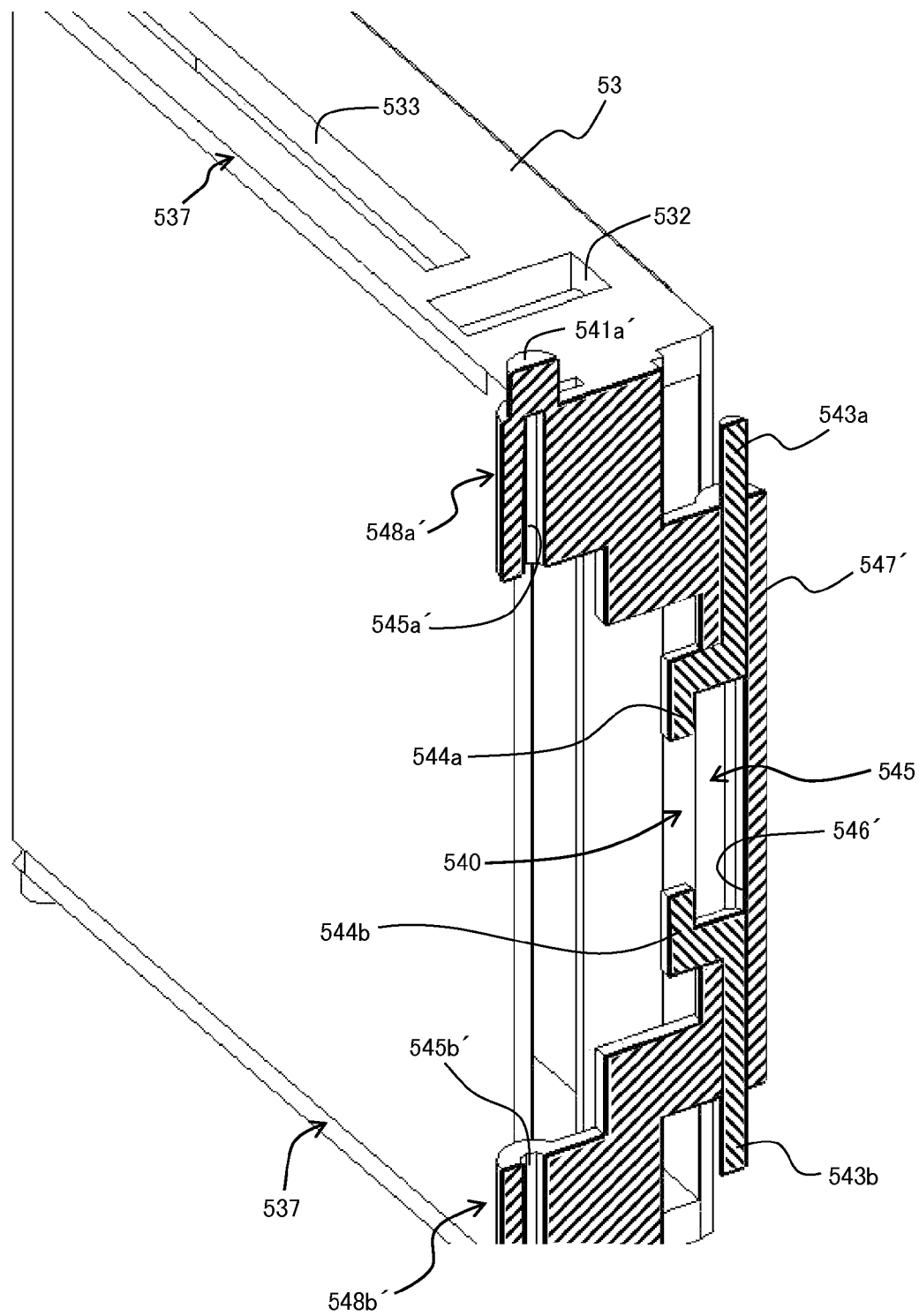
FIG. 24 is s diagram illustrating a magazine according to a modified example of an embodiment.

FIGS. 23 to 27 are diagrams illustrating a magazine 5 according to a modified example of the embodiment, FIG. 23 and FIGS. 25 to 27 are partial perspective views illustrating a back surface, and FIG. 24 is a partial perspective view illustrating a cross section of a part thereof.

In the magazine 5 illustrated in FIG. 23, instead of inserting the connection shaft 54 into the first hinge shaft hole 546 and the second hinge shaft hole 545 and pivotally supporting the first hinge shaft hole 546 and the second hinge shaft hole 545, second hinge shaft holes 545a' and 545b' of second hinge barrels 548a' and 548b' are pivotally supported by connection bars 543a and 543b protruding from a first hinge barrel 547'.

The first hinge barrel 547' is arranged in the flexion axis direction at the back surface side of the magazine cell 53, similarly to the first hinge barrel 547. The two second hinge barrels 548a' and 548b' are formed at the position deviated from the first hinge barrel 547 in the consecutive direction along the flexion axis direction at the back surface side of the magazine cell 53, similarly to the second hinge barrel 548.

The first hinge barrel 547' and the second hinge barrels 548a' and 548b' are formed at the positions deviated in the flexion axis direction. In other words, as illustrated in, for example, FIG. 26, in a state in which a plurality of magazine cells 53 are lined up in the consecutive direction to be adjacent to each other, the first hinge barrel 547' of one magazine cell 53 does not interfere with the second hinge barrels 548a' and 548b' of another adjacent magazine cell 53. Further, the two second hinge barrels 548a' and 548b' are arranged at the position at which the first hinge barrel 547' is interposed therebetween in the flexion axis direction.

Further, in the state in which a plurality of magazine cells 53 are lined up in the consecutive direction to be adjacent to each other, a bar slide hole 546' formed in the first hinge barrel 547' of one magazine cell 53 is configured to communicate the second hinge shaft holes 545a' and 545b' of another adjacent magazine cell 53.

As illustrated in FIG. 24, the first hinge barrel 547' arranged in the flexion axis direction on the back surface side of each magazine cell 53 includes the bar slide hole 546' penetrating in the flexion axis direction. Further, the connection bars 543a and 543b are slidably inserted into the bar slide hole 546'.

As the connection bars 543a and 543b slide in the bar slide hole 546', respective end portions protrude from the top surface side and the bottom surface side of the bar slide hole 546'. In the example illustrated in FIGS. 23 to 27, the connection bar 543a protrudes to the top surface side of the bar slide hole 546', and the connection bar 543b protrudes to the bottom surface side of the bar slide hole 546'.

Knobs 544a and 544b are formed on the other ends of the connection bars 543a and 543b, respectively. Each of the knobs 544a and 544b protrudes from a slit-like opening 540 formed in the flexion axis direction near the center of the first hinge barrel 547'. As the knobs 544a and 544b protruding from the opening 540 are moved along the opening 540 in the flexion axis direction, the connection bars 543a and 543b slide in the bar slide hole 546', and the respective end portions protrude from the top surface side and the bottom surface side of the bar slide hole 546', respectively.

Further, in the first hinge barrel 547', a compression spring storage portion 545 is formed between the connection bar 543a and the connection bar 543b, that is, between the knobs 544a and 544b. A compression spring (not illustrated) is stored in the compression spring storage portion 545.

The compression spring urges the connection bars 543a and 543b in the flexion axis direction to increase a gap therebetween. The compression spring urges the connection bars 543a and 543b so that the connection bar 543a protrudes from the bar slide hole 546' to the top surface side, and the connection bar 543b protrudes from the bar slide hole 546' to the bottom surface side.

Figure 25:
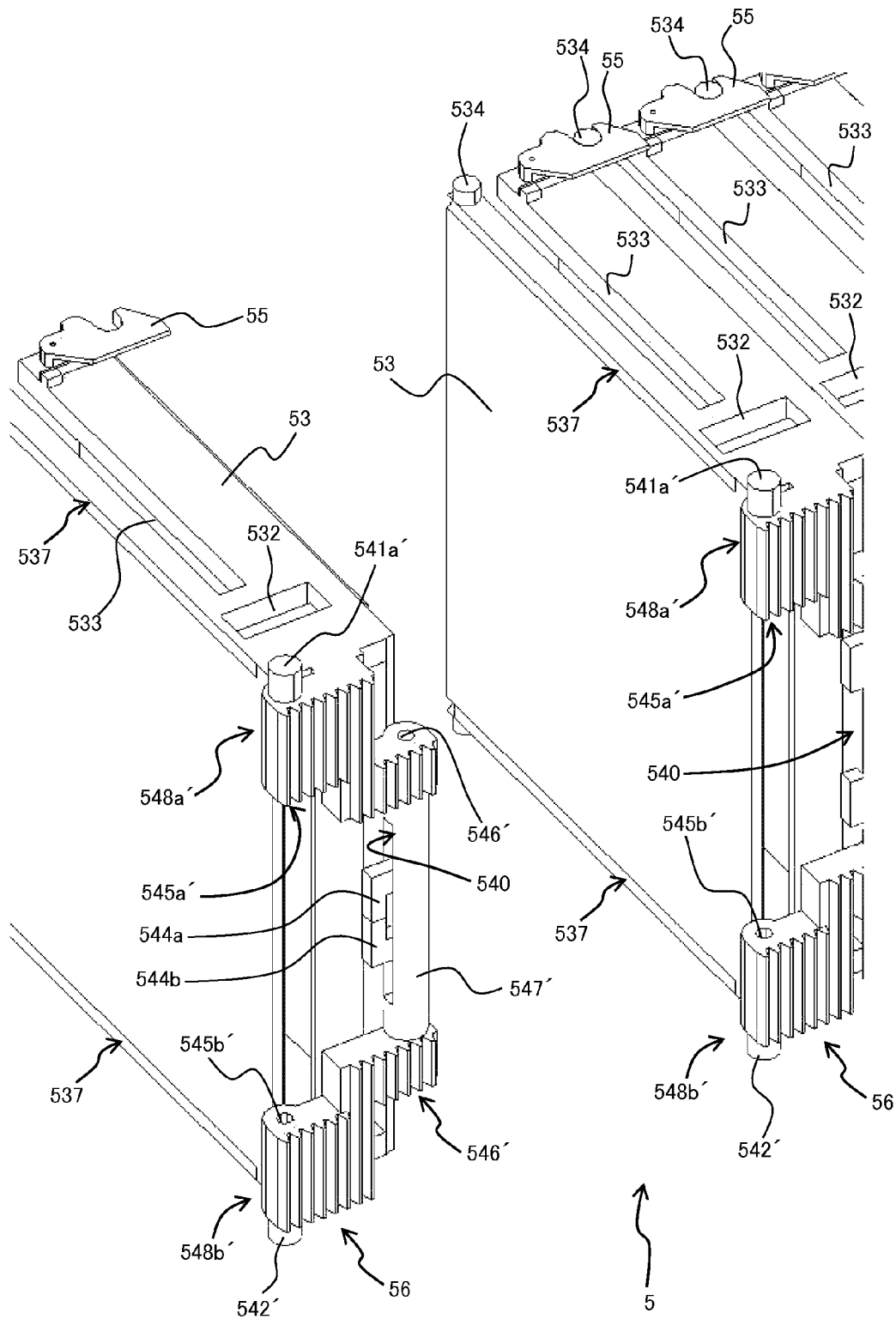
FIG. 25 is a diagram illustrating a magazine according to a modified example of an embodiment.

Further, as illustrated in FIG. 25, in the state in which the knobs 544a and 544b are close to each other in the opening 540, the end portions of the connection bars 543a and 543b are stored in the bar slide hole 546'.

The second hinge barrel 548a is formed on the top surface side of the back surface of the magazine cell 53, and a second hinge shaft hole 545a' that is opened on the bottom surface side is farmed in the flexion axis direction. The second hinge barrel 548b is formed on the bottom surface side of the back surface of the magazine cell 53, and a second hinge shaft hole 545b' that is opened on the top surface side is formed in the flexion axis direction.

Further, the connection bar 543a of another adjacent magazine cell 53 is inserted into the second hinge shaft hole 545a', and the connection bar 543b of another adjacent magazine cell 53 is inserted into the second hinge shaft hole 545b'.

Further, a cylindrical protrusion 541a' having the same shape as the retainer 541a (see FIG. 7) is formed in the second hinge barrel 548a'. Further, a cylindrical protrusion 542' having the same shape as the shaft end portion 542 (see FIG. 7) is formed in the second hinge barrel 548b'. Similarly to the connection shaft 54 in the above embodiment, the protrusion 541a' and the protrusion 542' are moved while being guided along the connection shaft guide grooves 83 and 93 and the connection hook guide grooves 85 and 95.

When the magazine 5 is configured using the magazine cell 53 having the above configuration according to the modified example, first, the knobs 544a and 544b are caused to get closer to each other while sliding in the opening 540 to press and compress the compression spring arranged therebetween as illustrated in FIG. 25. As a result, the connection bars 543a and 543b retreat into the bar slide hole 546'.

Figure 26:
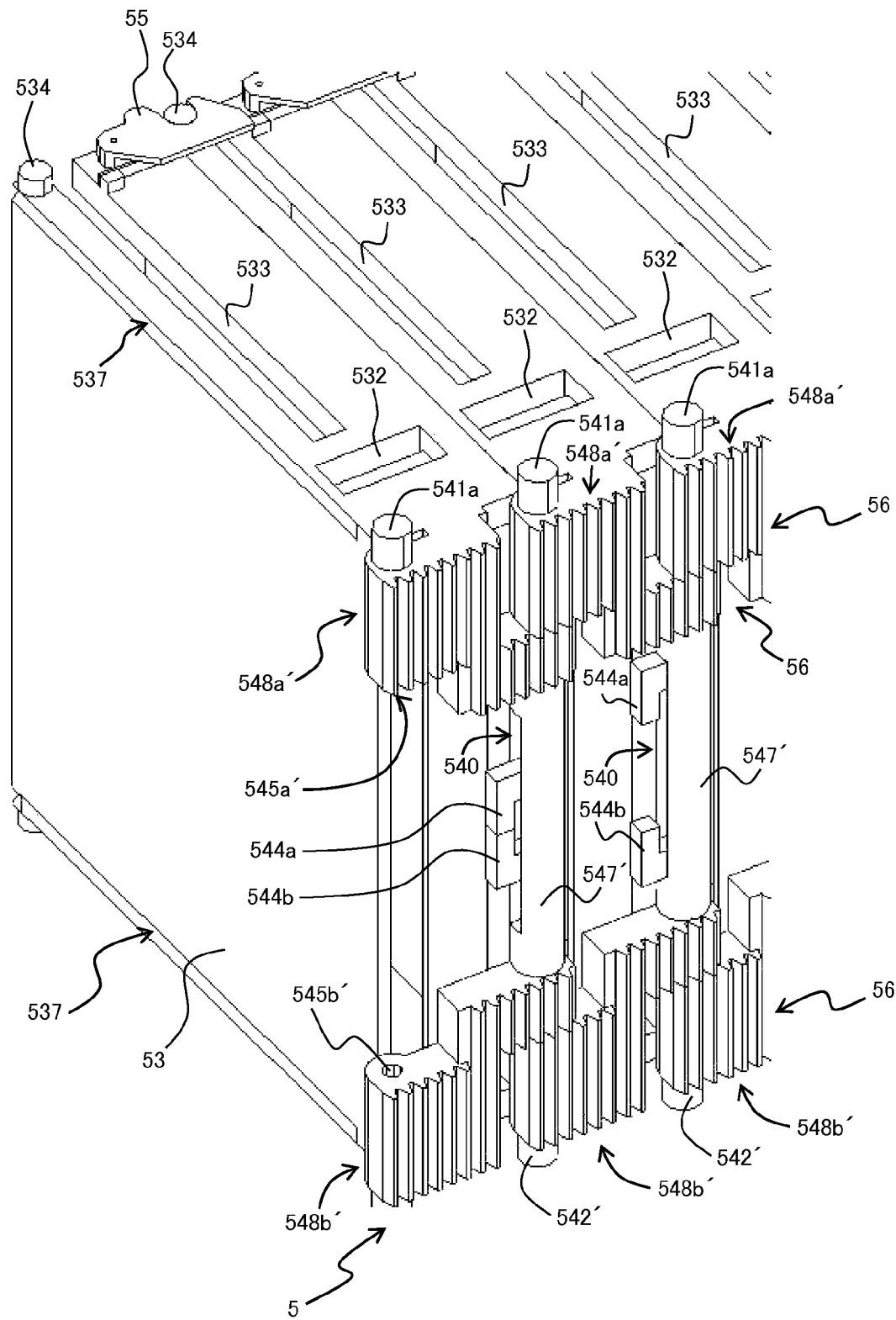
FIG. 26 is a diagram illustrating a magazine according to a modified example of an embodiment.

In this state, as illustrated in FIG. 26, the first hinge barrel 547 is arranged between the second hinge barrels 548a' and 548b' of another adjacent magazine cell 53. In other words, an alignment is performed so that the bar slide hole 546' of the first hinge barrel 547 of the magazine cell 53 communicates with the second hinge shaft holes 545a' and 545b' of the second hinge barrels 548a' and 548b' of another adjacent magazine cell 53.

Figure 27:
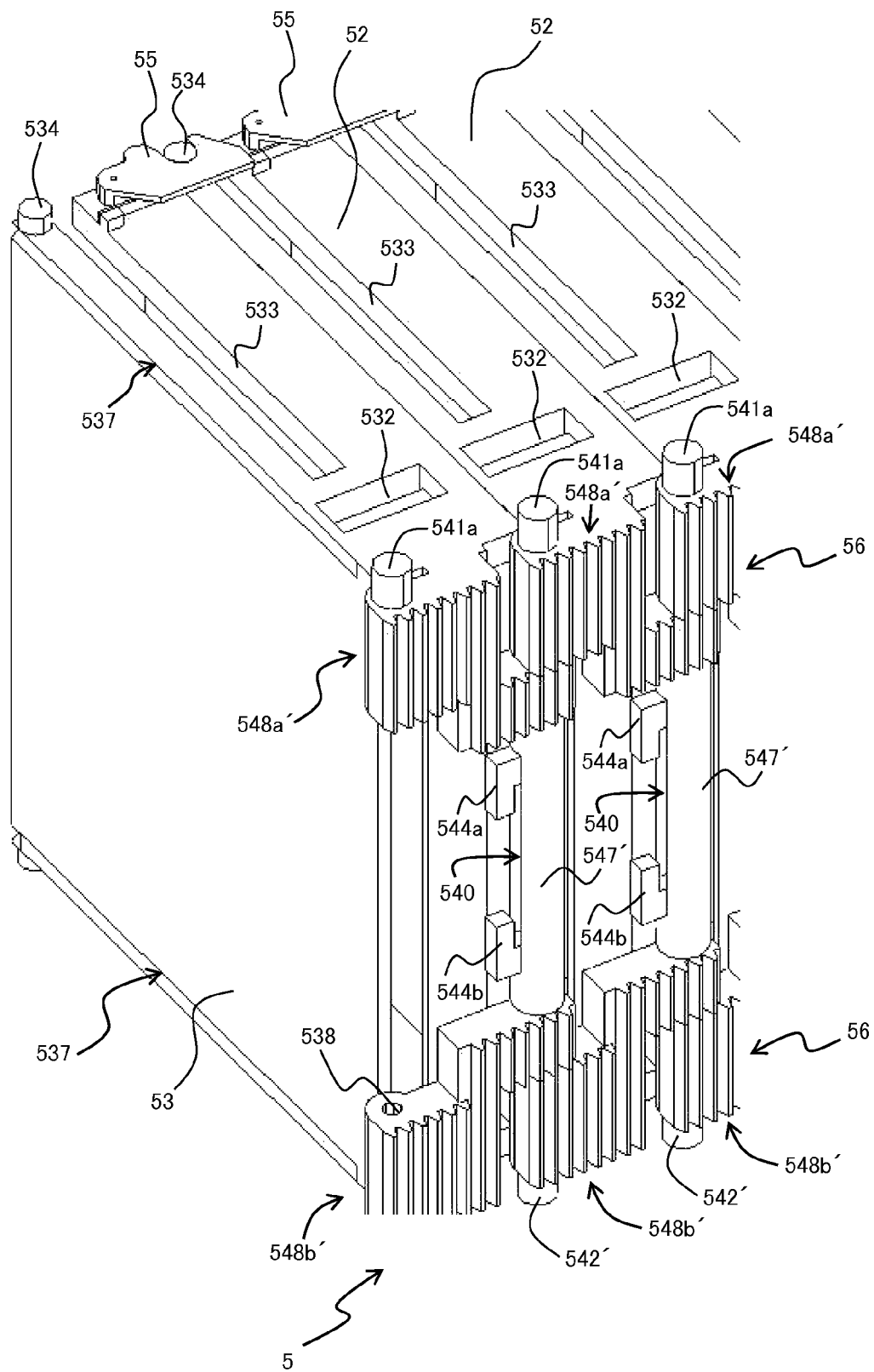
FIG. 27 is a diagram illustrating a magazine according to a modified example of an embodiment.

Thereafter, when a grip on the knobs 544a and 544b is lost, the connection bars 543a and 543b pressed by the compression spring protrude from the bar slide hole 546' and engage with the second hinge shaft holes 545a' and 545b' as illustrated in FIG. 27.

As a result, the magazine cell 53 and the adjacent magazine cell 53 are pivotally supported through the connection bars 543a and 543b. In other words, the magazine 5 is configured such that the adjacent two magazine cells 53 are hinge-connected.

In the modified example, the connection bars 543a and 543b, the first hinge barrel 547', and the second hinge barrels 548a' and 548b' configure the hinge member.

Further, as the reverse operation is performed, the connected magazine cells 53 can be easily disengaged from each other.

In the magazine 5 according to the modified example, the same operation and effects as in the above embodiment can be obtained. Further, the magazine cell 53 can be attached or detached by operating the knobs 544, and thus the convenience is high.

Figure 28:
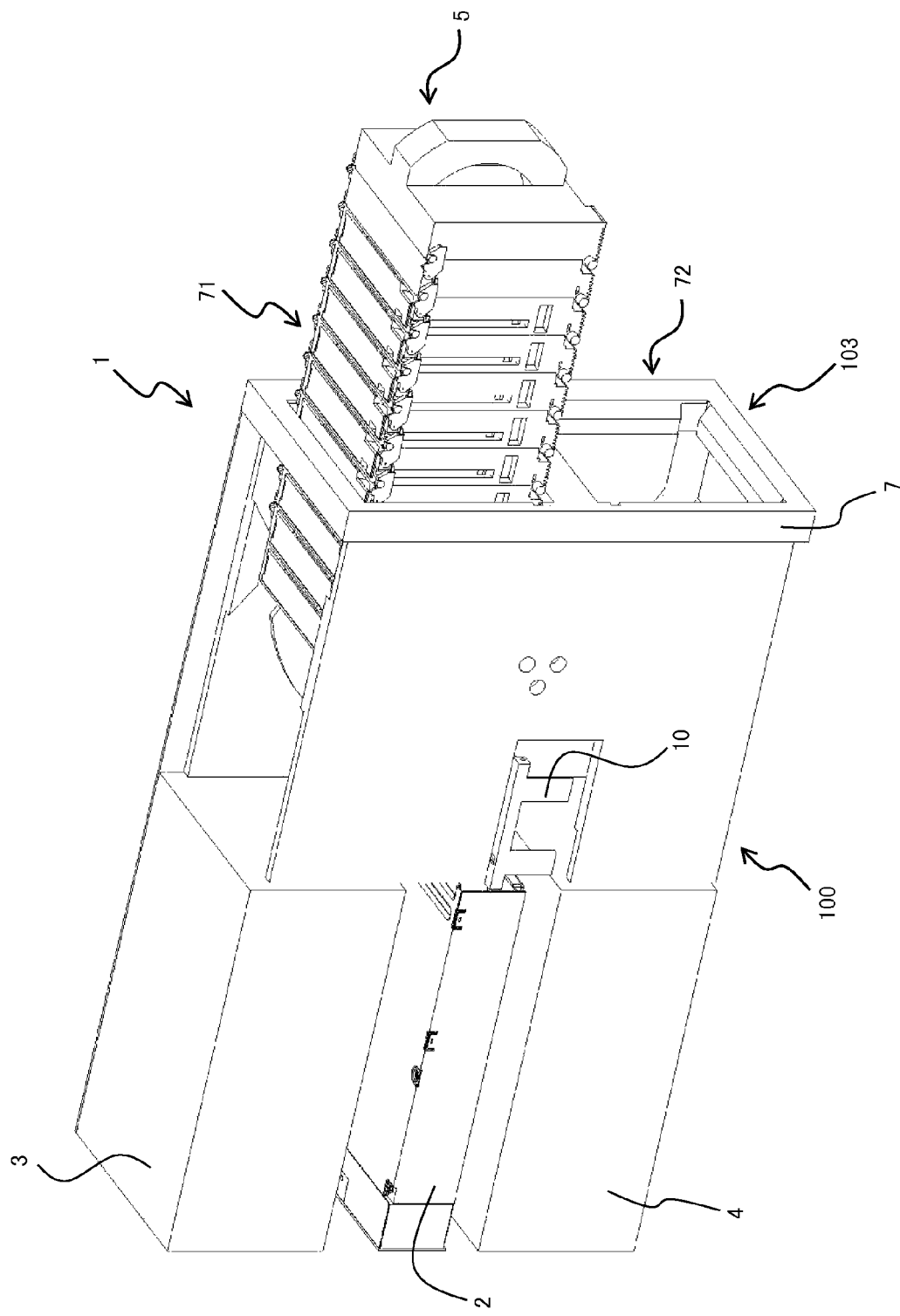
FIG. 28 is a perspective view illustrating a magnetic tape apparatus according to another modified example of an embodiment.
Figure 29:
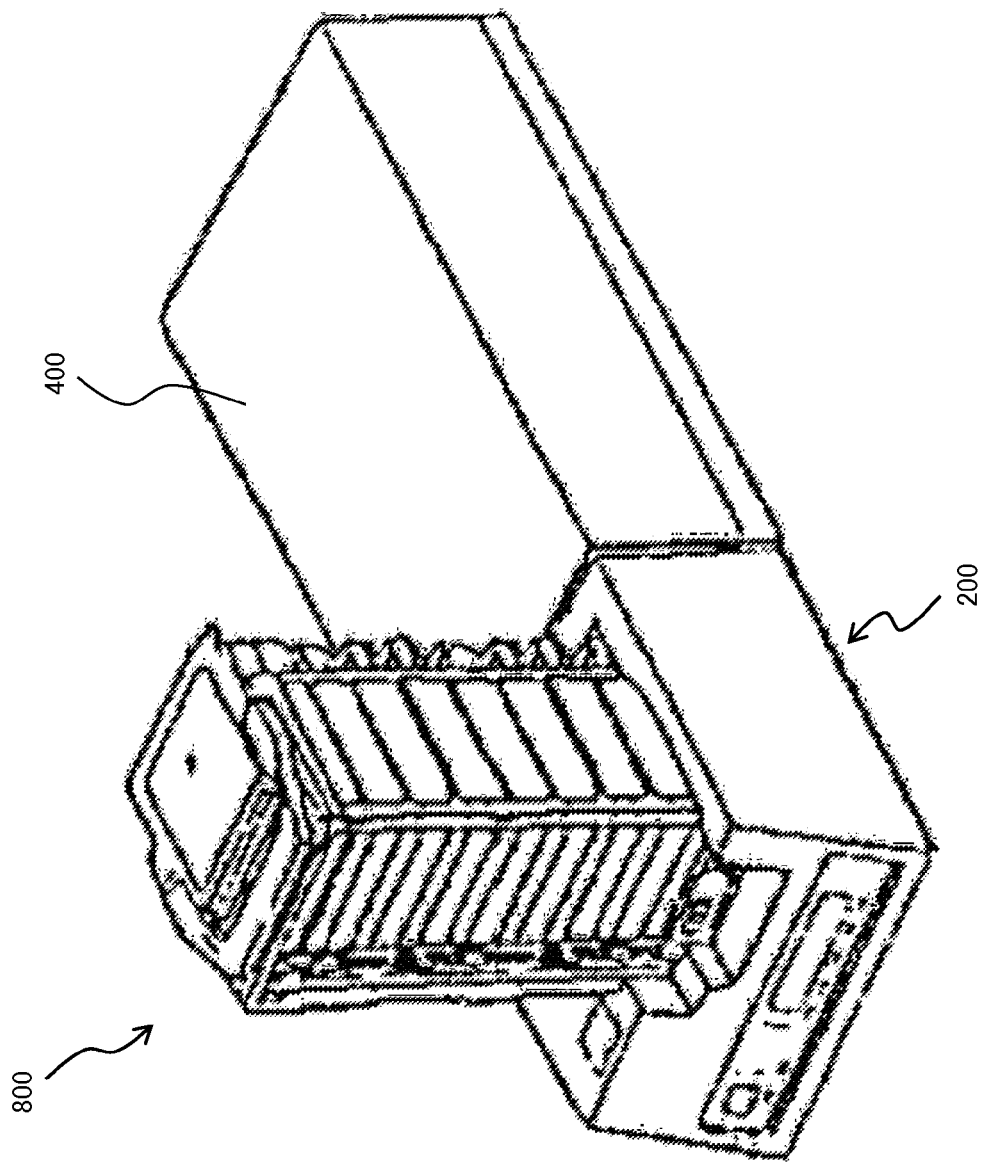
FIG. 29 is a perspective view illustrating an example of a magazine of a magnetic tape apparatus according to a related art.
Figure 30:
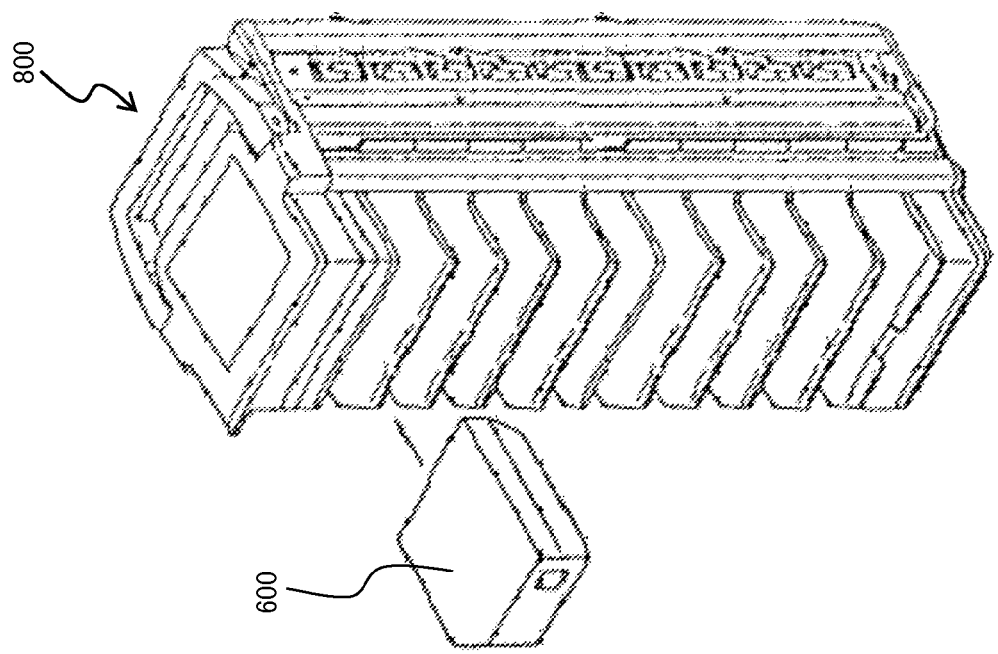
FIG. 30 is a perspective view illustrating an example of a magazine of a magnetic tape apparatus according to a related art.

FIG. 28 is a perspective view illustrating is a perspective view illustrating a magnetic tape apparatus 1 according to another modified example of the embodiment. As illustrated in FIG. 28, the magnetic tape apparatus 1 may be configured such that the insertion/extraction opening 71 and the protrusion opening 72 of the front cover 7 are vertically arranged. In this case, either of the insertion/extraction opening 71 and the protrusion opening 72 may be arranged on the upper side.

In the above embodiment and the modified example, the insertion/extraction opening 71 and the protrusion opening 72 may be inversely used.

Further, in the above embodiment and the modified example, the built-in tape cartridge 6 is used as the recording medium 6, but the present invention is not limited to this example, and various kinds of recording media can be used.

When the embodiment and the modified example of the present invention are disclosed, a person skilled in the art can embody and manufacture the present invention.

Using the disclosed technology, in a medium processing apparatus, a storage apparatus, and a conveyance apparatus, space saving can be achieved.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A medium processing apparatus comprising a processing unit performing a data recording and/or reading process on a plurality of storage media, comprising:
    a magazine comprising a plurality of storage units each stores therein one of the plurality of storage media, adjacent storage units being connected by a hinge member so that each of the storage units rotates on a shaft;
    a curved conveyance path that includes a first end and a second end, and guides the magazine in the first end and out of the second end;
    a conveying unit that conveys the magazine along the curved conveyance path; and
    a medium moving unit that moves one of the plurality of storage media between the storage unit of the conveyed magazine and the processing unit.

2. The medium processing apparatus according to claim 1, further comprising,
    a fixing member that fixes the hinge member at a closed position.

3. The medium processing apparatus according to claim 2, further comprising,
    a releasing member that releases the hinge member fixed by the fixing member in the curved conveyance path.

4. The medium processing apparatus according to claim 1, wherein an insertion/extraction opening through which the magazine is inserted or extracted is arranged in parallel with a protrusion opening through which the magazine protrudes, and
    the curved conveyance path connects the insertion/extraction opening and the protrusion opening.

5. The medium processing apparatus according to claim 1, wherein the magazine comprises hinge members arranged at one side along a consecutive direction in which the plurality of storage units are consecutive, and is configured to be bendable at the one side.

6. A portable storage apparatus that comprises a plurality of storage units each of which stores a storage medium and that is removably attached to a medium processing apparatus, the medium processing apparatus performing a data recording and/or reading process on the storage medium, the portable storage apparatus comprising:
    hinge members that connect adjacent storage units so that each of the storage units rotates on a shaft; and
    a fixing member that fixes the hinge member at a closed position.

7. The storage apparatus according to claim 6, wherein the hinge members are arranged at one side along a consecutive direction in which the plurality of storage units are consecutive, and the storage apparatus is configured to be bendable at the one side.

8. A conveyance apparatus, comprising:
    a magazine that comprises a plurality of storage units each of which stores an article, adjacent storage units being connected by a hinge member so that each of the storage units rotates on a shaft;
    a curved conveyance path that includes a first end and a second end, and guides the magazine in the first end and out of the second end;
    a conveying unit that conveys the magazine along the curved conveyance path; and
    an article moving unit that moves the article between the storage unit of the conveyed magazine and a processing unit that performs processing on the article.

* * * * *